(12) United States Patent
Choi et al.

(10) Patent No.: US 9,992,500 B2
(45) Date of Patent: Jun. 5, 2018

(54) TECHNIQUES FOR EVALUATING COMPRESSED MOTION VIDEO QUALITY

(71) Applicant: INTEL CORPORATION, Santa Clara, CA (US)

(72) Inventors: Lark Kwon Choi, Austin, TX (US); Yiting Liao, Hillsboro, OR (US); Barry O'Mahony, Banks, OR (US)

(73) Assignee: INTEL CORPORATION, Santa Clara, CA (US)

( * ) Notice: Subject to any disclaimer, the term of this patent is extended or adjusted under 35 U.S.C. 154(b) by 400 days.

(21) Appl. No.: 14/218,352

(22) Filed: Mar. 18, 2014

(65) Prior Publication Data

US 2015/0271496 A1 Sep. 24, 2015

(51) Int. Cl.

| | |
|---|---|
| *H04N 7/12* | (2006.01) |
| *H04N 19/172* | (2014.01) |
| *H04N 21/44* | (2011.01) |
| *H04N 21/6543* | (2011.01) |
| *H04N 19/12* | (2014.01) |
| *H04N 19/154* | (2014.01) |

(52) U.S. Cl.
CPC .......... *H04N 19/172* (2014.11); *H04N 19/12* (2014.11); *H04N 19/154* (2014.11); *H04N 21/44004* (2013.01); *H04N 21/6543* (2013.01)

(58) Field of Classification Search
CPC .......... H04N 21/23439; H04N 21/2402; H04L 65/80; H04L 65/4084
USPC ........................................ 375/240.01–240.29
See application file for complete search history.

(56) References Cited

U.S. PATENT DOCUMENTS

| | | | |
|---|---|---|---|
| 8,290,038 B1 * | 10/2012 | Wang | H04N 19/139 375/240.02 |
| 8,355,342 B2 | 1/2013 | Yamagishi et al. | |
| 9,037,743 B2 * | 5/2015 | Kordasiewicz | H04L 65/80 709/231 |
| 9,113,147 B2 * | 8/2015 | Raveendran | H04N 5/144 |
| 2005/0259947 A1 | 11/2005 | Wang et al. | |
| 2010/0008241 A1 * | 1/2010 | Gustafsson | G06T 7/0002 370/252 |
| 2011/0126248 A1 | 5/2011 | Fisher et al. | |

(Continued)

OTHER PUBLICATIONS

Office Action received for Chinese Patent Application No. 201510082328.7, dated Jul. 4, 2017, 9 pages (untranslated).

*Primary Examiner* — Gims Philippe

(57) ABSTRACT

Various embodiments are generally directed to techniques for evaluating video quality of compressed versions of a motion video to select compressed frames of that motion video without access to an uncompressed version. A device to transmit motion video includes a device scoring component to select a set of coefficients from a vector correlating temporal complexity values to sets of coefficients based on a temporal complexity of a first compressed frame of a first compressed video data, the vector derived from opinion scores associated with at least one viewing characteristic of a viewing device; and a selection component to select either the first compressed frame or a second compressed frame of a second compressed data to transmit to the viewing device based on a metric of video quality derived from the selected set of coefficients, the first and second compressed data representing a motion video. Other embodiments are described and claimed.

24 Claims, 14 Drawing Sheets

(56) References Cited

U.S. PATENT DOCUMENTS

| | | | |
|---|---|---|---|
| 2013/0297743 A1* | 11/2013 | Eschet | H04L 65/60 709/219 |
| 2014/0219088 A1* | 8/2014 | Oyman | H04N 21/23439 370/231 |
| 2015/0341667 A1* | 11/2015 | Liao | H04L 65/4076 375/240.27 |

* cited by examiner

TECHNIQUES FOR EVALUATING COMPRESSED MOTION VIDEO QUALITY

TECHNIQUES FOR EVALUATING COMPRESSED MOTION VIDEO QUALITY

Background

The transmission of motion videos via packet-based networks (e.g., the Internet) has become increasingly commonplace. In such transmissions, motion videos are usually compressed using any of a variety of forms of video compression, including various versions of the Motion Picture Experts Group (MPEG) specification promulgated by the International Organization for Standardization of Geneva, Switzerland, and the H.26x series of specifications promulgated by the International Telegraph Union (ITU) also of Geneva, Switzerland. Such forms of video compression typically employ lossy techniques that take advantage of various characteristics commonly observed in many pieces of motion video and of various limitations of the human visual system (HVS).

Although such networks continue to expand their bitrate capacity, both the demand for their use in transmitting motion videos and the resolution of motion videos have also grown such that the bitrate capacity available to transmit any one motion video at any given time continues to be limited. Thus, despite considerable technological improvement in such networks, it is still necessary to select a balance between video quality and the bitrate required to transmit each motion video. Various techniques have been devised to evaluate the video quality of compressed versions of motion videos to assist in selecting such a balance, but these techniques typically require access to motion videos in their original uncompressed form. Unfortunately, for reasons such as protecting intellectual property (e.g., copyrights in motion videos), network access providers and motion video streaming service providers often do not have access to such uncompressed versions of motion videos.

DETAILED DESCRIPTION

Figure 1:
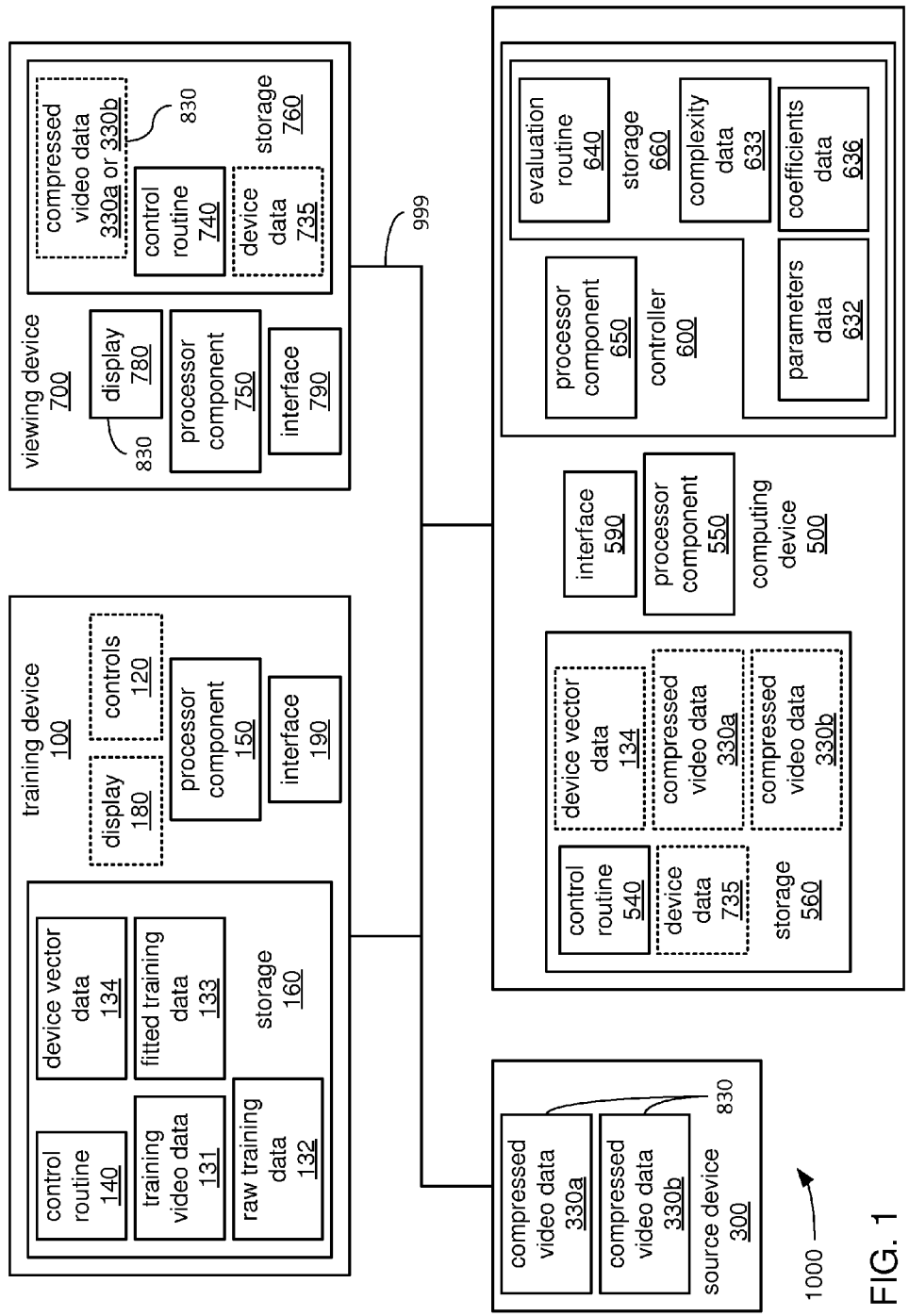
FIG. 1 illustrates an embodiment of a video processing system.

Various embodiments are generally directed to techniques for evaluating the video quality of one or more compressed versions of a motion video as an input to selecting compressed frames of that motion video for transmission without having access to the motion video in an uncompressed form. A metric of image quality of the motion video based on temporal complexity is combined with an opinion metric of image quality associated with viewing devices of selected viewing characteristics in viewing a selected set of motion videos. The temporal complexity is based on changes in content between frames of the motion video due to movement of objects that the human visual system (HVS) is relatively like to be sensitive to. The selected viewing characteristics of viewing devices that are accounted for with the opinion metric include one or more of display size, display resolution and associated viewing distance. The selection of compressed frames may be a selection from among different sets of compressed frames of the motion video, where each set of compressed frames has been compressed to different degrees.

During a training phase, numerous motion videos of a training set of motion videos are visually presented on a display of a viewing device having selected viewing characteristics, and raw data is collected of opinions of persons to whom those visual presentations are made. In some embodiments, the raw data may be made up of numeric values representing image quality as judged by those persons, and the range of numeric values may be from 1 to 5 in keeping with the widely known and used mean opinion score (MOS) evaluation technique. The motion videos of the training set may be selected for their temporal complexities to provide the training set with a desired range (e.g., a range wide enough to include temporal complexities of a wide variety of types of video content, such computer-generated, natural outdoor scenery, building interior scenery, up-close facial features, etc.) and/or distribution of temporal complexity values (e.g., an even distribution, a bell-curve distribution, etc.). The raw data is then analyzed using a non-linear fitting technique to derive first and second mathematical models defining a relationship between temporal complexity and the opinion scores from the raw data. The first and second mathematical models may be represented by first and second non-linear coefficients, respectively.

For each of the motion videos of the training set, its metric of temporal complexity is used with the first non-linear coefficient to derive a corresponding first set of coefficients, and then pairs of those temporal complexities and corresponding first sets of coefficients are combined to form a first vector. Correspondingly, the metric of temporal complexity of each of the motion videos of the training set is used with the second non-linear coefficients to derive a corresponding second set of coefficients, and then pairs of those temporal complexities and corresponding second sets of coefficients are combined to form a second vector. Together, the first and second vectors correlate a range of temporal complexities to sets of coefficients indicative of opinion metrics associated with viewing devices having the selected viewing characteristics.

During a later transmission phase, the video quality of one or more compressed versions of another motion video is evaluated. This evaluation may occur as the motion video is transmitted or in preparation for such transmission to a viewing device having similar viewing characteristics. The compressed versions of the motion video may have been generated using any of a variety of lossy motion video compression algorithms. In some embodiments, the compression algorithm may be one of the various versions of MPEG. The one or more compressed versions of the motion video are analyzed to derive various parameters of each frame, including one or more of a quantization parameter employed in compressing it, its data size (e.g., its size in bits or bytes), its frame type, its resolution and its bitrate. The derived parameters of each frame are then employed to calculate a temporal complexity for each frame. The derived temporal complexity of each frame is then employed in selecting the ones of the first and second linear coefficients from the first and second vectors, respectively.

In some embodiments, the selected first and second sets of coefficients for each frame, along with the bitrate, are then employed to derive a corresponding estimated MOS for each frame (sometimes referred to as a "temporal MOS score"). The range of values of the estimated MOS for each frame may be subjected to limits that maintain the estimated MOS for every frame within a predetermined range of numerical values. In such embodiments, the range may again be from 1 to 5. In other embodiments, the selected first and second sets of coefficients for each frame, along with a desired MOS, are then employed to derive a corresponding estimated bitrate. The range of values of the estimated bitrate for each frame may be subjected to limits, such as an upper limit of what bitrate is able to be supported for transmission, or a range of acceptable bitrates associated with a desired target bitrate.

Regardless of whether a MOS is estimated as achieved based on a given bitrate or a bitrate is estimated to be required to achieve a desired MOS, the resulting estimated MOS or bitrate may be employed to select compressed frames of more than one available compressed version of the motion video to transmit to the viewing device to achieve an accepted balance between video quality and bitrate. Alternatively or additionally, the resulting estimated MOS or estimated bitrate may be employed to determine a required level of buffering of compressed video data representing the motion video by the viewing device to achieve an accepted balance between video quality and bitrate.

As an alternative to per-frame analysis in the transmission frame, embodiments are possible in which analysis is performed per motion video. Thus, one or more compressed versions of another motion video are analyzed to derive various parameters of each frame. However, the derived parameters of each frame are aggregated (e.g., via an average, weighted average, etc.) and employed to calculate a temporal complexity for the entire motion video, and this derived temporal complexity is then employed in selecting ones of the first and second linear coefficients from the first and second vectors, respectively, for the entire motion video.

The selected first and second sets of coefficients, along with the bitrate for the entire motion video, are then employed to derive a corresponding estimated MOS for the entire motion video (sometimes referred to as an "overall MOS score"). The range of values of the estimated MOS for the motion video may be subjected to limits that maintain it within a predetermined range of numerical values (e.g., from 1 to 5). In other embodiments, the selected first and second sets of coefficients, along with a desired MOS for the entire motion video, are then employed to derive a corresponding estimated bitrate for the entire motion video. Again, the range of values of the estimated bitrate for each frame may be subjected to limits.

The resulting estimated MOS or estimated bitrate may be employed to select one of the compressed versions of the motion video to transmit to the viewing device to achieve an accepted balance between video quality and bitrate. Alternatively or additionally, the resulting estimated MOS or estimated bitrate may be employed to determine a required level of buffering of compressed video data representing the motion video by the viewing device to achieve an accepted balance between video quality and bitrate.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a video processing system 1000 incorporating one or more of a training device 100, a source device 300, a computing device 500 and a viewing device 700. During a training phase in the video processing system 1000, the training device 100 generates a device vector data 134 that correlates a range of temporal complexities of motion videos to sets of coefficients indicative of opinion metrics of viewing devices having selected viewing characteristics. The training device 100 then provides the device vector data 134 to the computing device 500 for later use in selecting compressed frames of a motion video for viewing with viewing devices having similar selected characteristics. During a later transmission phase, the computing device 500 selects compressed frames of a motion video 830 to transmit to a viewing device 700 based on which compressed frames achieve an accepted balance between video quality and transmission bitrate. The computing device 500 may receive from a source device 300 at least compressed video data 330a and 330b, each of which represents the motion video 830 in compressed form, but each of which is compressed to a different degree. The viewing device 700 has viewing characteristics similar to the viewing characteristics associated with the device vector data 134. The computing device 500 employs a combination of metrics of video quality based on the motion of objects in the motion video in compressed form and opinion metrics associated with the vector data 134 to select compressed frames of one or more of at least the compressed data 330a and 330b to transmit to the viewing device 700. Thus, the viewing device 700 receives the motion video 830 in compressed form made up of compressed frames selected to take into account viewing characteristics similar to those of the viewing device 700. Each of these computing devices may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 100, 300, 500 and 700 exchange signals conveying at compressed data representing motion video and/or data related to video quality of motion video compression through a network 999. However, one or more of these computing devices may exchange other data entirely unrelated to motion video or video quality with each other and/or with still other computing devices (not shown) via the network 999. In various embodiments, the network may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the training device 100 incorporates one or more of a processor component 150, a storage 160, controls 120, a display 180 and an interface 190 to couple the training device 100 to the network 999. The storage 160 stores one or more of a control routine 140, training video data 131, raw training data 132, fitted training data 133 and the device vector data 134. The training video data 131 is made up of pieces of data representing multiple motion videos that together form a training set of motion videos. In some embodiments, the training video data 131 may represent at least a portion of a database of motion videos. The motion videos of the training set may be selected for their temporal complexity to cause the training set to cover a selected range of temporal complexities and/or to impart a selected distribution of temporal complexities to the training set (e.g., an even distribution, a bell-curve distribution, etc.).

The control routine 140 incorporates a sequence of instructions operative on the processor component 150 in its role as a main processor component of the training device 100 to implement logic to perform various functions. In executing the control routine 140 during a training phase, the processor component 150 may transmit or otherwise provide motion videos from the training video data 131 to a viewing device of selected viewing characteristics to be visually presented by that viewing device. The processor component 150 then receives and stores indications of opinion scores associated with those visual presentations as the raw training data 132 from which the processor component 150 subsequently derives the device vector data 134 that the processor component 150 provides to the computing device 500.

Figure 3:
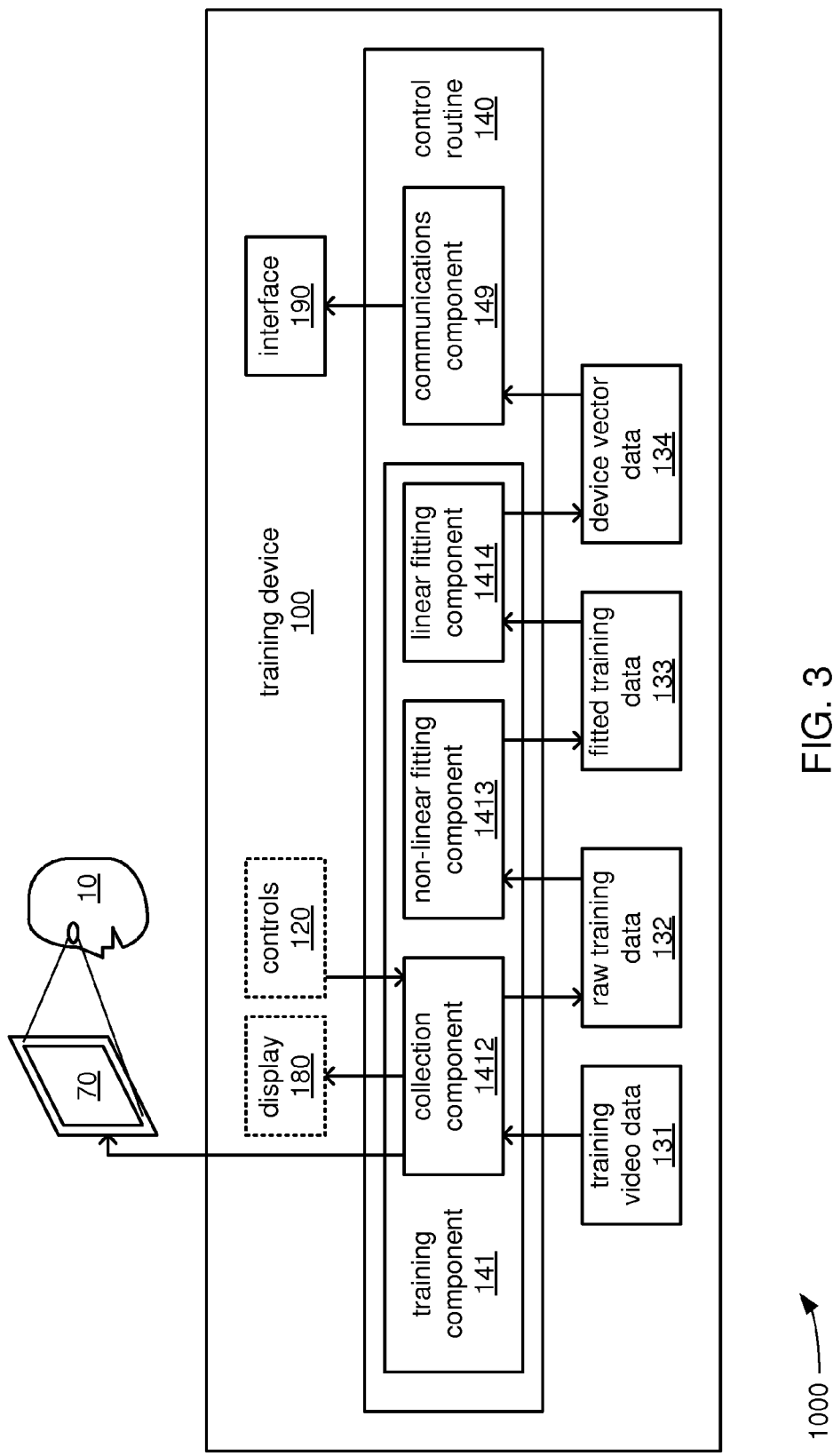
FIG. 3 illustrates a portion of an embodiment.
Figure 4:
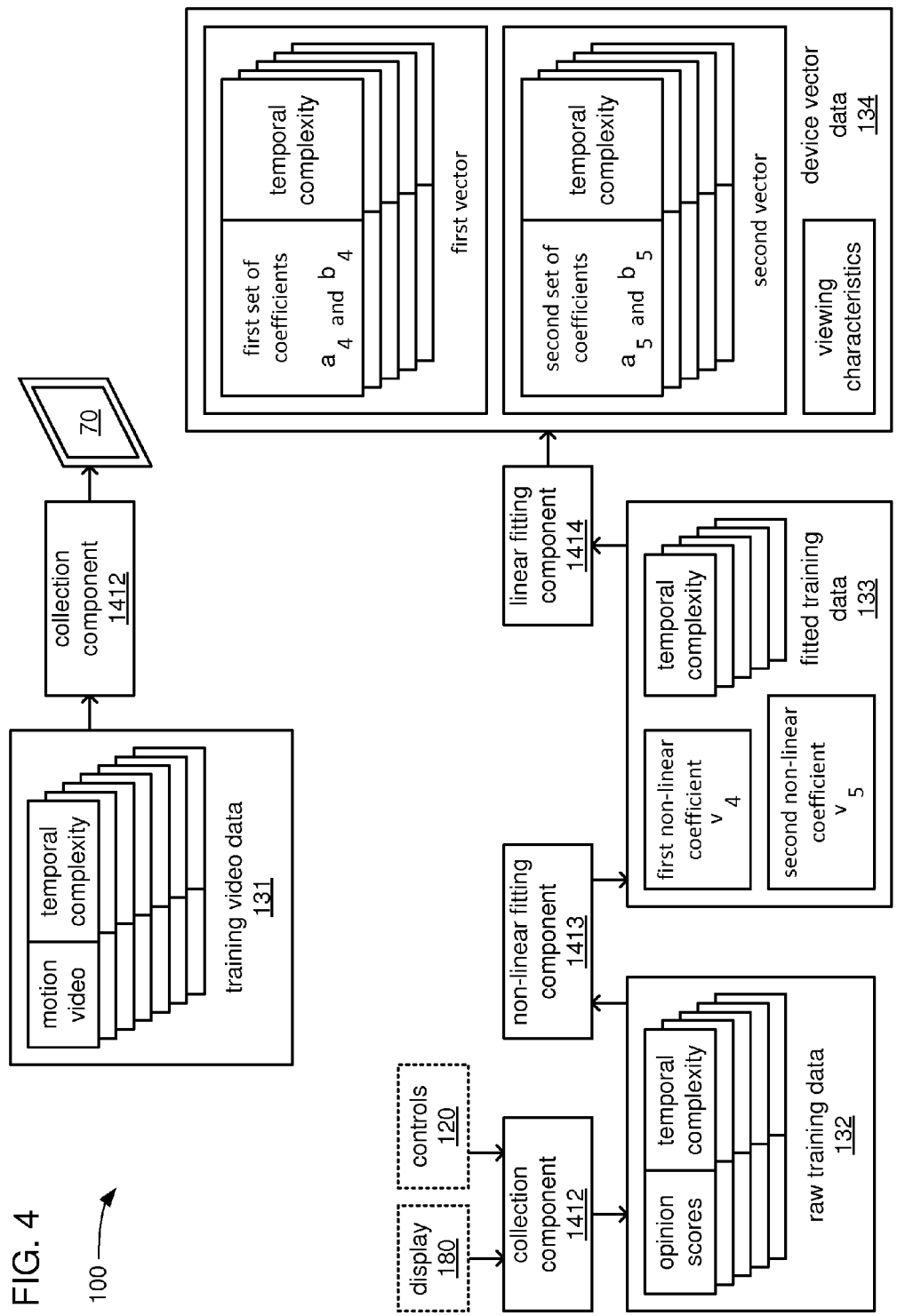
FIG. 4 illustrates an embodiment of data structures of the portion of FIG. 3.

FIG. 3 depicts an embodiment of such operation of the training device 100 in a training phase in greater detail, and FIG. 4 depicts aspects of data exchanged between components and/or other portions of that embodiment during such operation in a training phase in greater detail. As depicted, the control routine 140 may incorporate one or more of a training component 141 and a communications component 149. Further, the training component 141 may incorporate one or more of a collection component 1412, a non-linear fitting component 1413 and a linear fitting component 1414. In executing the control routine 140, the processor component 150 may execute one or more of the components 1412, 1413 and 1414 of the training component 141, as well as the communications component 149.

The collection component 1412 may provide motion videos of the training video data 131 to a viewing device 70 for visual presentation by a display of the viewing device to one or more persons 10. As depicted in FIG. 4, the training video data 131 may also include indications of the temporal complexity for each of the motion videos of the training set. Alternatively, the collection component 1412 may derive the temporal complexities of each of these motion videos. In some embodiments, each indication of temporal complexity stored in the training video data 131 for one of the motion videos of the training set may be a numerical value representing the average temporal complexity across all of the frames of the motion video.

The collection component 1412 may also operate the controls 120 and/or the display 180 to provide a user interface for use by persons viewing the motion videos of the training video data 131 to provide opinion scores of the image quality of each of the motion videos as visually presented by the viewing device 70. The controls 120 may be any of a variety of types of input device, including and not limited to a keyboard, a pointing device, etc. The display 180 may be based on any of a variety of display technologies, including and not limited to liquid crystal display (LCD) technology, electroluminescent (EL) technology, etc. Alternatively or additionally, the controls 120 and the display 180 may be combined into a single user interface device such as a touchscreen. Regardless of how the opinion scores are received from those persons, the collection component 1412 stores those opinion scores as the raw training data 132. As depicted in FIG. 4, the opinion scores may be organized per motion video of the training set within the raw training data 132, and may be correlated to indications of the temporal complexity for each of the motion videos of the training set that may also be included in the raw training data 132.

The non-linear fitting component 1413 analyzes the opinion scores of the raw training data 132 to derive first and second mathematical models of the mathematical relationship of the opinion scores to the temporal complexities of each of the motion videos of the training set. In so deriving the first and second mathematical models, the non-linear fitting component 1413 may derive first and second non-linear coefficients to represent the first and second mathematical models, and store them as the fitted training data 133. As depicted in FIG. 4, the fitted training data 133 may include indications of the temporal complexity for each of the motion videos of the training set.

The linear fitting component 1414 may employ the first and second non-linear coefficients of the fitted training data 133 to derive first and second sets of coefficients, respectively, for each of the different temporal complexities associated with each of the motion videos of the training set. In other words, separate first and second sets of coefficients are generated for each of the temporal complexities. The linear fitting component 1414 may then generate a first vector made up of all of the first sets of coefficients paired with their corresponding ones of the temporal complexities of the motion videos of the training set, and may store the first vector as the device vector data 134. Correspondingly, the linear fitting component 1414 may also generate a second vector made up of all of the second sets of coefficients paired with their corresponding ones of the temporal complexities of the motion videos of the training set, and may store the second vector as another part of the device vector data 134. As will be explained in greater detail, the pairing of these temporal complexities with their corresponding ones of the first and second sets of coefficients in the first and second vectors, respectively, may enable particular ones of the first and second sets of coefficients to be selected during a later transmission phase based on a temporal complexity of a frame of another compressed motion video.

In some embodiments, the techniques employed in deriving the first and second non-linear coefficients of the fitted training data 133 may represent a greatly modified version of the G.1070 opinion model promulgated by the Telecommunication Standardization Sector of the International Telecommunication Union (ITU-T). Unlike the G.1070 standard, viewing characteristics of a viewing device are taken into account. In such embodiments, the first and second non-linear coefficients $v_4$ and $v_5$ using the following equation:

$$MOS = 1 + 3.7\left(1 - \frac{1}{1 + \left(\frac{\text{bitrate}}{v_4}\right)v_5}\right)$$

This equation may be used iteratively with the MOSs and bitrates of each of the motion videos of the training set represented by the training video data 131 in a least squares fitting process to derive a single one of each these non-linear coefficients $v_4$ and $v_5$ for the entire training set.

The first set of coefficients may be made up of a pair of coefficients $a_4$ and $b_4$, and the second set of coefficients may be made up of another pair of coefficients $a_5$ and $b_5$. The first set of coefficients $a_4$ and $b_4$ for each of the motion videos of the training set may be derived from that motion video's temporal complexity TC, as well as the first non-linear coefficient $v_4$, using the following equation:

$$v_4 = a_4 \times TC + b_4$$

Correspondingly, the second set of coefficients $a_5$ and $b_5$ for each of the motion videos of the training set may be derived from that motion video's temporal complexity TC, as well as the second non-linear coefficient $v_5$, using the following equation:

$$v_5 = a_5 \times TC + b_5$$

These two equations may be used iteratively in another least squares fitting process to derive the first and second sets of coefficients for each temporal complexity TC corresponding to one of the motion videos of the training set. Thus, in such embodiments, the first vector of the device vector data 134 is made up of multiple correlated values for the first set of coefficients $a_4$ and $b_4$, and the temporal complexity TC. Correspondingly, the second vector of the device vector data 134 is made up of multiple correlated values for the second set of coefficients $a_4$ and $b_4$, and the temporal complexity TC.

The viewing device 70 may be any of a variety of types of device, including and not limited to a form of computing device, or a device more dedicated in its functionality to the viewing of motion video such as a television. The viewing device 70 has one or more viewing characteristics that may be germane to the perception of the image quality of the motion videos of the training video data 131 by the persons viewing them as those motion videos are visually presented by the viewing device 70. In particular, studies have revealed that the size and resolution of the display on which motion video is visually presented for viewing, and the viewing distance of a person's eyes from the display tend to have greater influence on perceived image quality than many other characteristics of a viewing device.

As familiar to those skilled in the art of human factors in viewing motion videos, various characteristics of a viewing device, such as its physical size or shape, its weight, and/or what features it possesses for being held in a hand or otherwise supported by another object may tend to encourage a specific viewing distance or range of viewing distances for viewing motion videos. Thus, although a viewing distance is not actually a characteristic of the viewing device itself, and is typically chosen by a person engaged in viewing a motion video, various other characteristics of the viewing device may tend to influence the choice of viewing distance sufficiently that there may be a correlation between those various characteristics of the viewing device itself and the viewing distance. It may be that multiple devices having displays of similar size and resolution tend to encourage a similar choice in viewing distance, and therefore, knowing the display size and resolution may enable the viewing distance to be determined with a relatively high degree of certainty. However, there may also be particular viewing devices with other characteristics unique to them that override the influence of such characteristics as display size and resolution such that knowing the identity of the particular viewing device (e.g., its manufacturer and/or model number) may be more useful in determining the viewing distance.

Thus, as depicted in FIG. 4, the device vector data 134 may also include an indication of viewing device characteristics of the viewing device 70. As will be explained in greater detail, this indication of viewing characteristics may be employed to enable the selection of the first and second vectors for use in selecting at least compressed frames of different compressed versions of the motion video 830 to transmit to another viewing device that may not be of the same manufacturer or model as the viewing device 70, but which may have some similar viewing characteristics.

Following generation of the device vector data 134, the communications component 149 may operate the interface 190 to transmit the device vector data 134 to the computing device 500 via the network 900. Alternatively or additionally, other mechanisms including removable storage media may be employed to convey the device vector data 134 to the computing device 500.

Returning to FIG. 1, as depicted, the source device 300 stores and is able to provide either or both of the compressed video data 330a and 330b. Both of the compressed video data 330a and 330b represent the motion video 830 in compressed form, but the compressed video data 330a and 330b are compressed to differing degrees such that each represents a different balance of bitrate and video quality. It should be noted that although just two compressed versions of the motion video 830, specifically the compressed video data 330a and 330b, are depicted, other embodiments are possible in which a different quantity of compressed versions of the motion video 830 are stored and/or are otherwise available. Indeed, it should also be noted that the source device 300 may be capable of generating a compressed version of the motion video 830 (e.g., a version of compressed video data representing the motion video 830) that meets a requested bitrate and/or a requested video quality. The source device 300 may provide at least one or both of the compressed video data 330a and 330b to the computing device 500 in response to a request received from the computing device 500 for one or more compressed versions of the motion video 830.

In some embodiments of the video processing system 1000, the source device 300 may be operated by a holder of intellectual property rights in the motion video 830 and/or another organization having access to an uncompressed version of the motion video 830 (e.g., a producer or distributor of motion videos). In such embodiments, the computing device 500 may be operated by a provider of network access services (e.g., an Internet service provider) and/or motion video transmission services (e.g., a video-on-demand network video streaming service). The operator of the computing device 500 may seek to provide the motion video 830 to the viewing device 700 in a compressed form that balances limiting the transmission bitrate with achieving at least an acceptable level of video quality, with that video quality evaluated in a manner that takes into account the viewing characteristics of the viewing device 700. To enable taking into account the viewing characteristics of the viewing device 700, the computing device 500 may retrieve (or be otherwise provided with) an indication of viewing characteristics of the viewing device 700.

Thus, the computing device 500 may be operated in a transmission phase to evaluate balances between bitrate and MOS of one or more compressed versions of the motion video 830, using opinion scores associated with the viewing characteristics of the viewing device 700, to select compressed frames of the motion video 830 to transmit to the viewing device 700. In selecting compressed frames, the computing device 500 may select all of the compressed frames of one of at least the compressed video data 330a and 330b (again, there may be more than just two compressed versions of the motion video 830). Alternatively, in selecting compressed frames, the computing device 500 may select subsets of the compressed frames of each of at least the compressed video data 330a and 330b.

Alternatively or additionally, the computing device 500 may be operated in a transmission phase to evaluate balances between bitrate and MOS of one or more compressed versions of the motion video 830 to determine a degree of buffering to be employed by the viewing device 700 to enable viewing of the motion video 830 without visual artifacts (e.g., stuttering motion, dropped frames, pixelation, etc.) caused by the motion video 830 being transmitted to the viewing device 700 in compressed form. Upon determining this degree of buffering, the computing device 500 may signal the viewing device with an indication of the degree of buffering to employ.

In various embodiments, the computing device 500 incorporates one or more of a processor component 550, a storage 560, a controller 600 and an interface 590 to couple the computing device 500 to the network 999. The storage 560 stores one or more of a control routine 540, the device vector data 134, the video data 330a, the video data 330b and device data 735. The controller 600 incorporates one or more of a processor component 650 and a storage 660. The storage 660 stores one or more of an evaluation routine 640, parameters data 632, complexity data 633 and coefficients data 636.

The control routine 540 incorporates a sequence of instructions operative on the processor component 550 in its role as a main processor component of the computing device 500 to implement logic to perform various functions. In executing the control routine 540 in a transmission phase in some embodiments, the processor component 550 may receive the video data 330a and 330b, each representing the motion video 830 in compressed form, from the source device 300, and may store at least a subset of the compressed frames of each in the storage 560. It should be noted that the video data 330a and/or 330b may be stored in the storage 560 for a considerable amount of time before any use is made of either, including evaluating video quality or transmission.

In further executing the control routine 540, the processor component 550 selects compressed frames from one or both of the video data 330a and 330b for transmission to the viewing device 700 based on results of video quality analysis performed via execution of the evaluation routine 640. It should be noted that such selection of compressed frames may entail selecting a mixture of compressed frames from each of the video data 330a and 330b in some embodiments, and may entail selecting all of the compressed frames of one or the other of the video data 330a and 330b in other embodiments. Alternatively or additionally, in further executing the control routine 540, the processor component 550 may signal the viewing device 700 to perform a degree of buffering, the degree of which may be based on results of video quality analysis performed via execution of the evaluation routine 640. The processor component 550 may signal the viewing device 700 with an indication of that degree of buffering.

The evaluation routine 640 incorporates a sequence of instructions operative on the processor component 650 in its role as a controller processor component of the controller 600 of the computing device 500 to implement logic to perform various functions. In executing the evaluation routine 640 in a transmission phase, the processor component 650 evaluates the video quality of each compressed frame of at least one of the video data 330a and/or 330b to determine whether compressed frames of one, the other or both are to be transmitted to the viewing device 700. It should be noted that the evaluation routine 640 may be executed by the processor component 650 either prior to transmission of any compressed frames representing the motion video 830 to the viewing device 700, or simultaneously therewith.

Figure 5A:
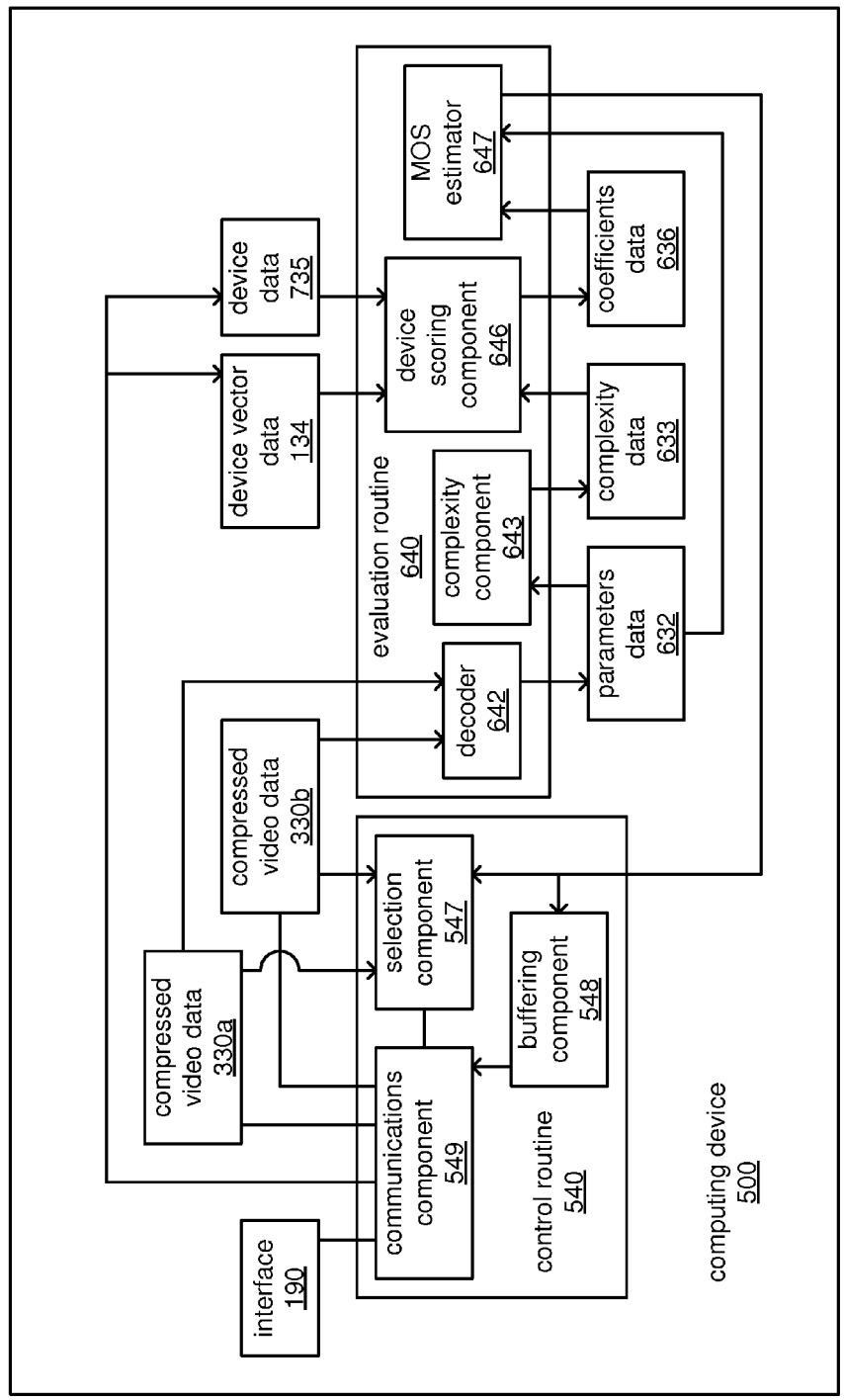
FIGS. 5A and 5B illustrates portions of another embodiment.
Figure 5B:
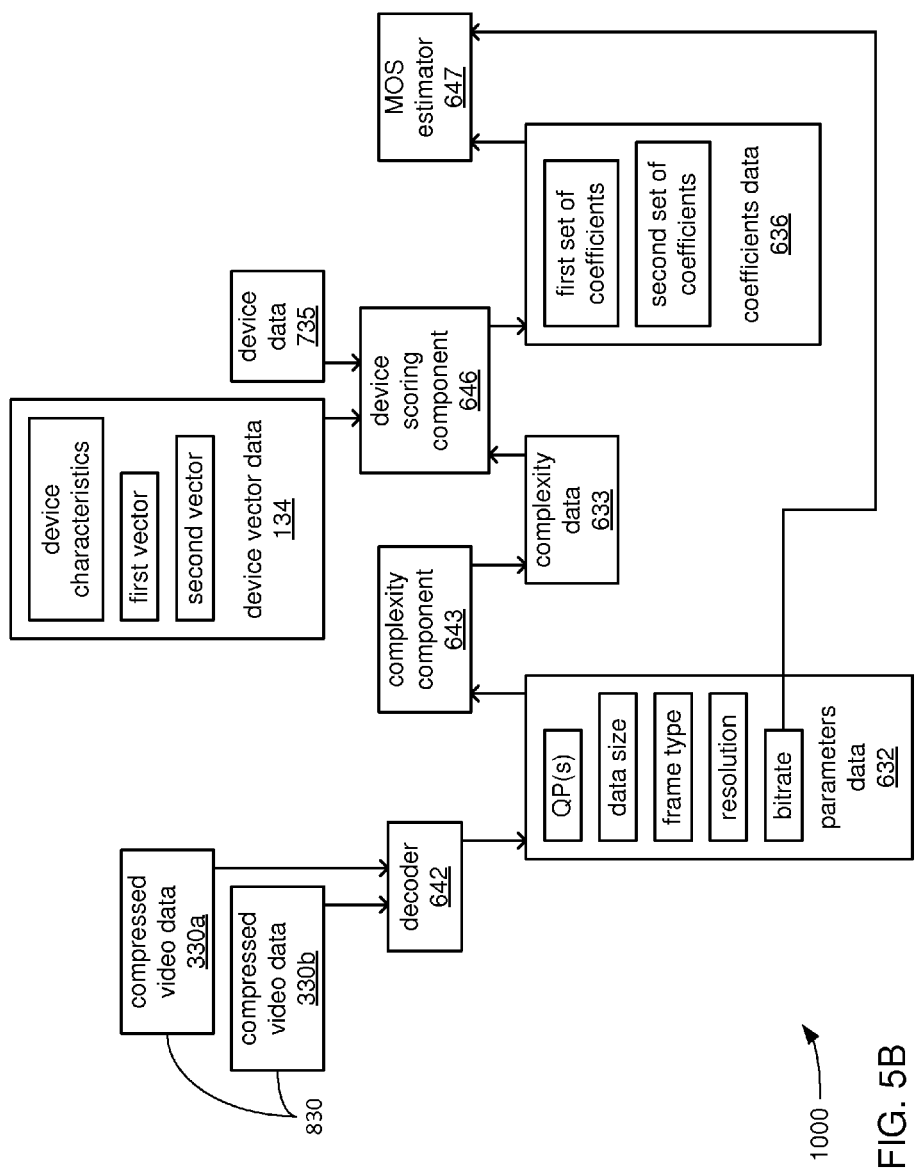

FIG. 5A depicts an embodiment of such operation of the computing device 500 in a transmission phase in greater detail, and FIG. 5B depicts aspects of data exchanged between components and/or other portions of that embodiment during such operation in a transmission phase in greater detail. As depicted, the control routine 540 may incorporate a selection component 547, a buffering component 548 and a communications component 549. Further, the evaluation routine 640 may incorporate one or more of a decoder 642, a complexity component 643, a device scoring component 646 and a MOS estimator 647. In executing the control routine 540, the processor component 550 may execute one or more of the components 547, 548 and 549. Correspondingly, in executing the evaluation routine 640, the processor component 640 may execute one or more of the components 642, 643, 646 and 647.

In preparation for evaluating the video quality of one or both of the compressed video data 330a and 330b, the communications component 549 may operate the interface 590 to receive one or more of the device vector data 134 from the training device 100, the video data 330a and/or 330b from the source device 300, and/or the device data 735 from the viewing device 700. Alternatively or additionally, other mechanisms including removable storage media may be employed to convey one or more of these pieces of data to the computing device 500.

The decoder 642 at least partly decompresses each of the compressed frames of one or both of the compressed video data 330a and 330b to derive various parameters of each compressed frame. As depicted in FIG. 5B, those parameters may include one or more QPs employed in compressing each frame, the data size of each compressed frame (e.g., the size of each compressed frame in bits or bytes), the type of each frame (e.g., an intra-frame, a predicted frame or a bi-predicted frame), the resolution of each frame (e.g., one or both of the horizontal and vertical resolutions in pixels), and/or the bitrate of each frame. The decoder 642 stores such parameters for each compressed frame as the parameters data 632 for use by the complexity component 643.

The complexity component 643 employs the parameters of the parameters data 632 to derive a metric of temporal complexity for each of the compressed frames, and stores indications of those metrics as the complexity data 633 for use by the device scoring component 646. In some embodiments, this metric of temporal complexity TC for each predicted frame (P-frame) among the compressed frames is determined via the following equation:

$$TC = \left(\frac{\text{mean(data size)}}{(0.87^{\text{mean}(QP)})}\right) \times \left(\frac{\text{frames per second}}{\text{vertical resolution}}\right)$$

In this equation, "data size" is the quantity of bits occupied by the P-frame, QP is one of the quantization parameters employed in compression to generate the P-frame, "frames per second" is the quantity of frames for every second of motion video, and "vertical resolution" is the quantity of horizontal lines in the P-frame.

It should be noted that in some embodiments, including embodiments in which the compression algorithm employed to generate the video data 330a and/or 330b is a version of MPEG, the decoder 642 may decode only predicted frames (P-frames) and/or the complexity component 643 may derive a metric of temporal complexity only for P-frames. This may be deemed desirable based on the pixel color values of the pixels of P-frames being described with reference to other frames such that they represent an indication of change in pixel color values occurring over a period of time, including change caused by movement. In contrast, the pixel color values of intra-frames (I-frames) are fully described without reference to the pixel color values of any other frame such that they convey no indication of a change occurring over a period of time.

The device scoring component 646 retrieves at least the device vector data 134 and the complexity data 633, and uses them together to determine the first and second sets of coefficients to be provided to the MOS estimator 647 as the coefficients data 636. As has been discussed, the first and second vectors conveyed in the device vector data 134 are associated with viewing devices having one or more viewing characteristics similar to those of the viewing device 70 that was earlier employed in begetting the opinion scores from which the first and second vectors of the device vector data 134 were derived. Presuming that the viewing device 700 has viewing characteristics such as display size and display resolution that are similar to those of the viewing device 70, then the first and second vectors of the device vector data 134 may properly be used in conjunction with selecting compressed frames to transmit to the viewing via the viewing device 700.

In some embodiments, there may be multiple instances (not shown) of the device vector data 134, each associated with viewing devices having different viewing characteristics (e.g., having a display of a different size and/or different resolution). In such embodiments, the device scoring component 646 may also retrieve the device data 735 received from the viewing device 700 and providing indications of one or more characteristics of the viewing device 700. The device scoring component 646 may compare the viewing characteristics of the viewing device 700 indicated in the device data 735 to viewing characteristics specified in each of the instances of the device vector data 134 to identify the one instance of the vector data 134 associated with viewing characteristics that most closely match those of the viewing device 700.

For each compressed frame for which the complexity data 633 provides an indication of temporal complexity, that indication of temporal complexity is compared to the temporal complexities included in each of the first and second vectors to identify the first and second sets of coefficients that correspond to the closest of those temporal complexities, and that will be provided to the MOS estimator 647 as the coefficients data 636 for that compressed frame. In effect, the multiple temporal complexity values included in each of the first and second vectors are employed as an index, with the temporal complexity value indicated in the complexity data 633 for that compressed frame used with that index to select the first and second sets of coefficients, respectively.

The MOS estimator 647 employs the first and second sets of coefficients of the coefficients data 636, along with an indication of bitrate that may be retrieved from the parameters data 632 and an indication of temporal complexity retrieved from the complexity data 633, to derive an estimated MOS for each compressed frame of the motion video 830 as represented by either of the compressed video data 330a or 330b. In some embodiments, the estimated MOS may be determined using the following equations:

$$v_4 = a_4 \times TC + b_4$$

$$v_5 = a_5 \times TC + b_5$$

$$\text{estimated } MOS = 1 + 3.7\left(1 - \frac{1}{1 + \left(\frac{\text{bitrate}}{v_4}\right)v_5}\right)$$

where $a_4$ and $b_4$ make up the first set of coefficients retrieved from the first vector, and $a_5$ and $b_5$ make up the first set of coefficients retrieved from the second vector. The first set of coefficients $a_4$ and $b_4$ are used, along with the temporal complexity TC of the compressed frame (as indicated complexity data 633), to re-derive non-linear coefficient $v_4$ associated with the compressed frame. Correspondingly, the second set of coefficients $a_5$ and $b_5$ are used, along with the temporal complexity TC of the compressed frame (again, as indicated complexity data 633), to re-derive non-linear coefficient $v_5$ associated with the compressed frame. In essence, as a result of being re-derived using the temporal complexity TC of the compressed frame, these re-derived versions of these non-linear coefficients take into account the temporal complexity of a portion of the motion video 830.

These re-derived non-linear coefficients $v_4$ and $v_5$ are then employed, along with the bitrate associated with the compressed frame (as indicated in the parameters data 632), to derive the estimated MOS. The estimated MOS derived in this manner may then be subjected to minimum and maximum limits such that the value of the estimated MOS is modified to fall within a range of 1 to 5 if it does not already do so. Whether subjected to limits, or not, the MOS estimator 647 provides the resulting estimated MOS to one or both of the selection component 547 and the buffering component 548 of the control routine 540.

In embodiments that incorporate the selection component 547, the selection component 547 may select compressed frames of one or the other of the compressed video data 330a and 330b to transmit to the viewing device 700 based on the estimated MOS received from the MOS estimator 647. By way of example, where the compressed video data 330a represents the motion video 830 in a form that is compressed to a greater degree than the compressed video data 330b, the video quality of the compressed video data 330a may be analyzed to determine whether the video quality of compressed frames of the compressed data 330a is high enough to meet a desired minimum video quality. Where there are compressed frames of the compressed data 330a for which the video quality is indicated by their estimated MOSs to not be high enough, then compressed frames of the compressed data 330b may be substituted for those compressed frames of the compressed data 330a such that the viewing device 700 is provided with a compressed form of the motion video 830 made up of a mixture of compressed frames from each of the compressed video data 330a and 330b. Alternatively, the entirety of the compressed data 330b may be selected to be transmitted to the viewing device 700 instead of the compressed video data 330a, such that all of the compress frames of the compressed video data 330a are effectively replaced with all of the compressed frames of the compressed video data 330b.

In embodiments that incorporate the buffering component 548, the buffering component 548 may indicate to the viewing device 700 a need to alter the degree of buffering (e.g., increase or decrease the degree of buffering) provided by the viewing 700 in receiving and visually presenting a compressed form of the motion video 830. By way of example, where the compressed video data 330a represents the motion video 830 in a form that is compressed to a greater degree than the compressed video data 330b, at least some compressed frames of the compressed video data 330b may be selected as a result of the video quality of corresponding compressed frames of the compressed video data 330a not being high enough (according to estimated MOS). In response, and given the lesser degree of compression of the compressed video data 330b, the buffering component 548 may signal the viewing device 700 to increase the degree of buffering it employs in visually presenting the motion video 830 to accommodate the higher bitrate of those compressed frames of the compressed video data 330b.

Figure 6A:
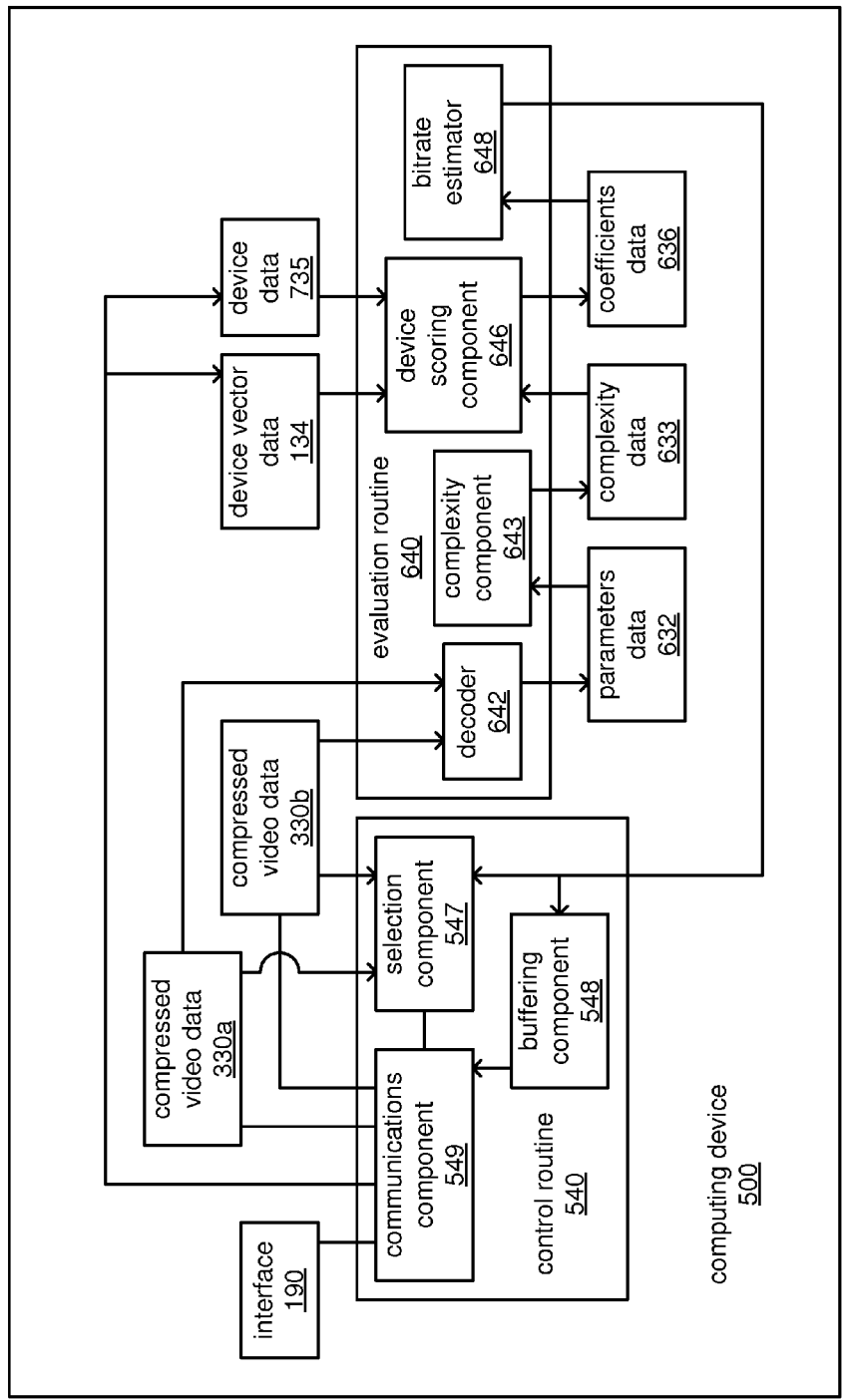
FIGS. 6A and 6B illustrates portions of still another embodiment.
Figure 6B:
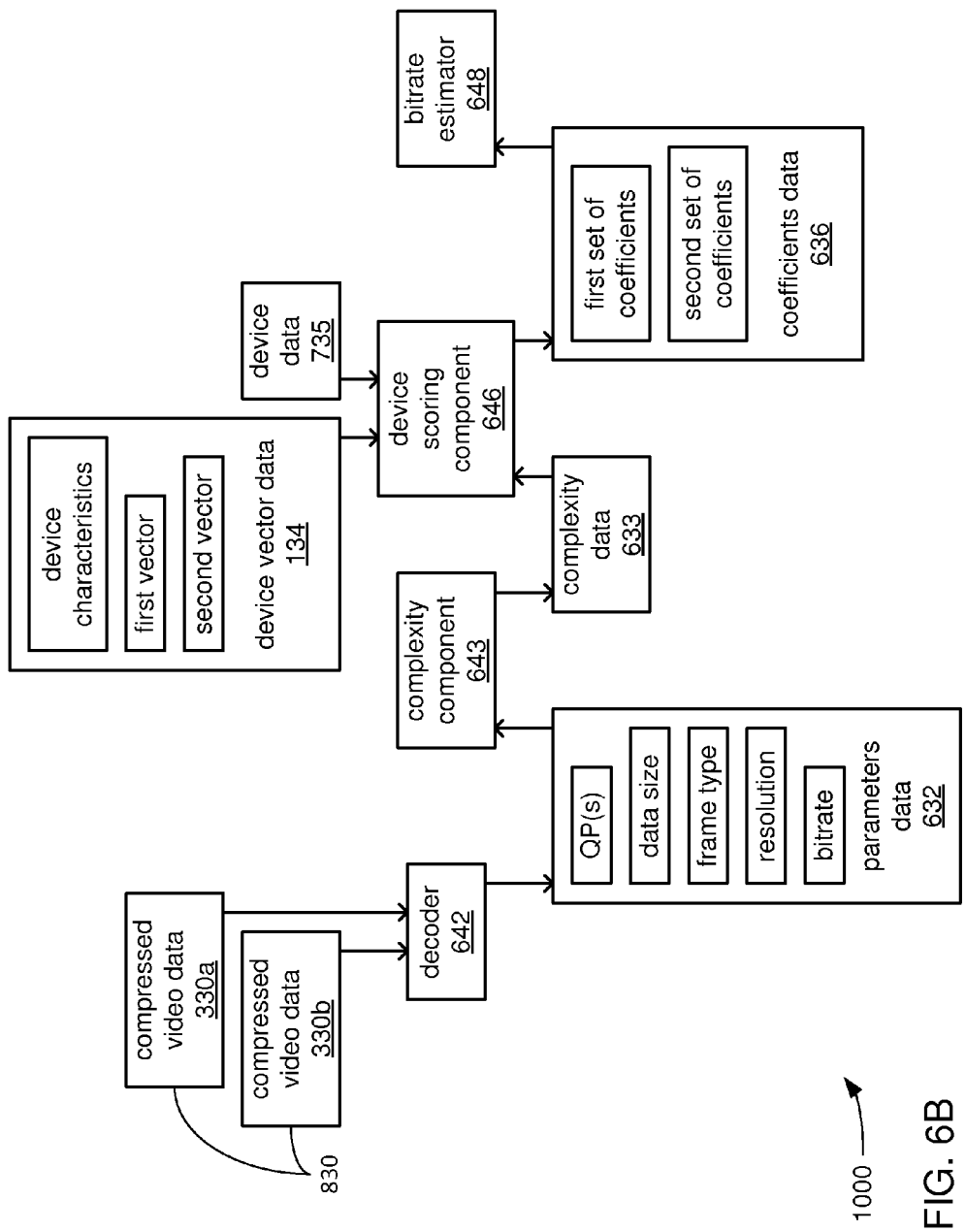

FIG. 6A depicts an alternate embodiment of operation of the computing device 500 in a transmission phase in greater detail, and FIG. 6B depicts aspects of data exchanged between components and/or other portions of that embodiment during such operation in a transmission phase in greater detail. The embodiment of FIGS. 6A-B is similar to the embodiment of the FIGS. 5A-B in numerous ways such that similar components are designated with similar reference numerals. In one difference between these two embodiments, the MOS estimator of the embodiment of FIGS. 5A-B is replaced with a bitrate estimator 648 in the embodiment of FIGS. 6A-B.

The bitrate estimator 648 employs the first and second sets of coefficients of the coefficients data 636, along with an indication of the temporal complexity retrieved from the complexity data 633 and an indication of a desired minimum MOS, to derive an estimated bitrate required to reach that desired MOS in transmitting the motion video 830 to the viewing device 700 in compressed form, based on analyzing the compressed video data 330a and/or 330b representing the motion video 830. In some embodiments, this estimated bitrate may be determined using the following equations:

$$v_4 = a_4 \times TC + b_4$$
$$v_5 = a_5 \times TC + b_5$$
$$\text{estimated bitrate} = v_4 \left( \frac{1}{1 - \left( \frac{(\text{desired MOS}) - 1}{3.7} \right)} - 1 \right)^{1/v_5}$$

where, again, $a_4$ and $b_4$ make up the first set of coefficients retrieved from the first vector, and $a_5$ and $b_5$ make up the first set of coefficients retrieved from the second vector. Again, the first set of coefficients $a_4$ and $b_4$ are used, along with the temporal complexity TC of the compressed frame (as indicated complexity data 633), to re-derive non-linear coefficient $v_4$ associated with the compressed frame. Correspondingly, the second set of coefficients $a_5$ and $b_5$ are used, along with the temporal complexity TC of the compressed frame (again, as indicated complexity data 633), to re-derive non-linear coefficient $v_5$ associated with the compressed frame.

These re-derived non-linear coefficients $v_4$ and $v_5$ are then employed, along with the desired MOS, to derive the estimated bitrate. The estimated bitrate derived in this manner may then be subjected to minimum and/or maximum limits based on available bandwidth for a given network (e.g., the network 999) and/or other factors. Whether subjected to limits, or not, the bitrate estimator 648 provides the resulting estimated bitrate to one or both of the selection component 547 and the buffering component 548 of the control routine 540.

In embodiments that incorporate the selection component 547, the selection component 547 may select compressed frames of one or the other of the compressed video data 330a and 330b to transmit to the viewing device 700 based on which has a bitrate closer to the estimated bitrate received from the bitrate estimator 648. By way of example, where the compressed video data 330a represents the motion video 830 in a form that is compressed to a greater degree than the compressed video data 330b, the video quality of the compressed video data 330a may be analyzed to derive an estimate of what bitrate is required to achieve a desired minimum MOS (e.g., a MOS of 3 on a scale from 1 to 5). Where the estimated bitrate that is derived is higher than the bitrate of the compressed video data 330a and is closer to the bitrate of the compressed video data 330b, then compressed frames of the compressed data 330b may be substituted for those compressed frames of the compressed data 330a such that the viewing device 700 is provided with a compressed form of the motion video 830 made up of a mixture of compressed frames from each of the compressed video data 330*a* and 330*b*. Alternatively, the entirety of the compressed data 330*b* may be selected to be transmitted to the viewing device 700 instead of the compressed video data 330*a*, such that all of the compress frames of the compressed video data 330*a* are effectively replaced with all of the compressed frames of the compressed video data 330*b*.

In embodiments that incorporate the buffering component 548, the buffering component 548 may indicate to the viewing device 700 a need to alter the degree of buffering (e.g., increase or decrease the degree of buffering) provided by the viewing 700 in receiving and visually presenting a compressed form of the motion video 830. By way of example, where the compressed video data 330*a* represents the motion video 830 in a form that is compressed to a greater degree than the compressed video data 330*b*, at least some compressed frames of the compressed video data 330*b* may be selected as a result of an estimated bitrate required to meet a desired minimum MOS being higher than the bitrate of the compressed video data 330*a* and closer to the bit rate of the compressed video data 330*b*. In response, the buffering component 548 may signal the viewing device 700 to increase the degree of buffering it employs in visually presenting the motion video 830 to accommodate the higher bitrate of those compressed frames of the compressed video data 330*b*.

Returning to FIG. 1, in various embodiments, the viewing device 700 incorporates one or more of a processor component 750, a storage 760, a display 780 and an interface 790 to couple the viewing device 700 to the network 999. The storage 760 stores one or more of a control routine 740, the device data 735, and compressed frames of one or both of the compressed video data 330*a* and 330*b*. The control routine 740 incorporates a sequence of instructions operative on the processor component 750 in its role as a main processor component of the viewing device 700 to implement logic to perform various functions. In executing the control routine 740 in some embodiments, the processor component 750 may operate the interface 790 to transmit the device data 735 indicating one or more viewing characteristics of the viewing device (e.g., size and/or resolution of the display 780) to the computing device 500. The processor component 750 may also operate the interface 790 to receive compressed frames of one or both of the compressed video data 330*a* and 330*b*, may buffer those compressed frames, may decompress those compressed frames, and may visually present the motion video 830 represented by the now decompressed frames on the display 780. The processor component 750 may further operate the interface 790 to receive an indication to increase or decrease a degree of buffering of those compressed frames.

Figure 2:
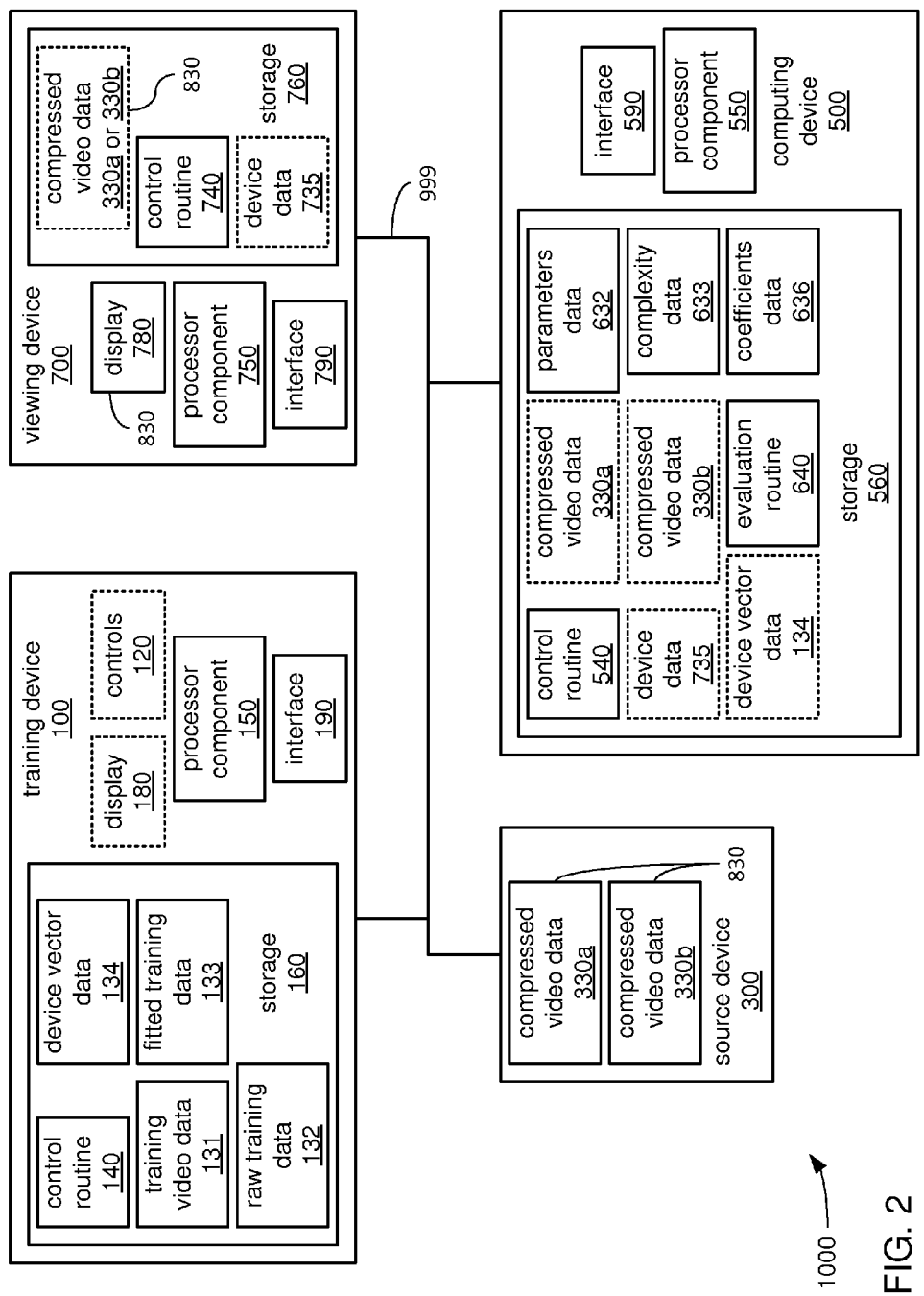
FIG. 2 illustrates an alternate embodiment of a video processing system.

FIG. 2 illustrates a block diagram of an alternate embodiment of the video processing system 1000 that includes an alternate embodiment of the computing device 500. The alternate embodiment of the video processing system 1000 of FIG. 2 is similar to the embodiment of FIG. 1 in many ways, and thus, like reference numerals are used to refer to like elements throughout. However, unlike the computing device 500 of FIG. 1, the computing device 500 of FIG. 2 does not incorporate the controller 600. Thus, unlike the computing device 500 of FIG. 1, in the computing device 500 of FIG. 2, it is the processor component 550 that executes the evaluation routine 640 in lieu of there being a processor component 650 to do so. Therefore, in the alternate embodiment of the video processing system 1000 of FIG. 2, the processor component 550 may evaluate compressed frames of the compressed video data 330*a* and/or 330*b* representing the motion video 830 in compressed form.

In various embodiments, each of the processor components 150, 550, 650 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

Although each of the processor components 150, 550, 650 and 750 may include any of a variety of types of processor, it is envisioned that the processor component 650 of the controller 600 (if present) may be somewhat specialized and/or optimized to perform tasks related to graphics and/or video. More broadly, it is envisioned that the controller 600 embodies a graphics subsystem of the computing device 500 to enable the performance of tasks related to graphics rendering, video compression, image rescaling, etc., using components separate and distinct from the processor component 550 and its more closely related components.

In various embodiments, each of the storages 160, 560, 660 and 760 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 190, 590 and 790 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 7:
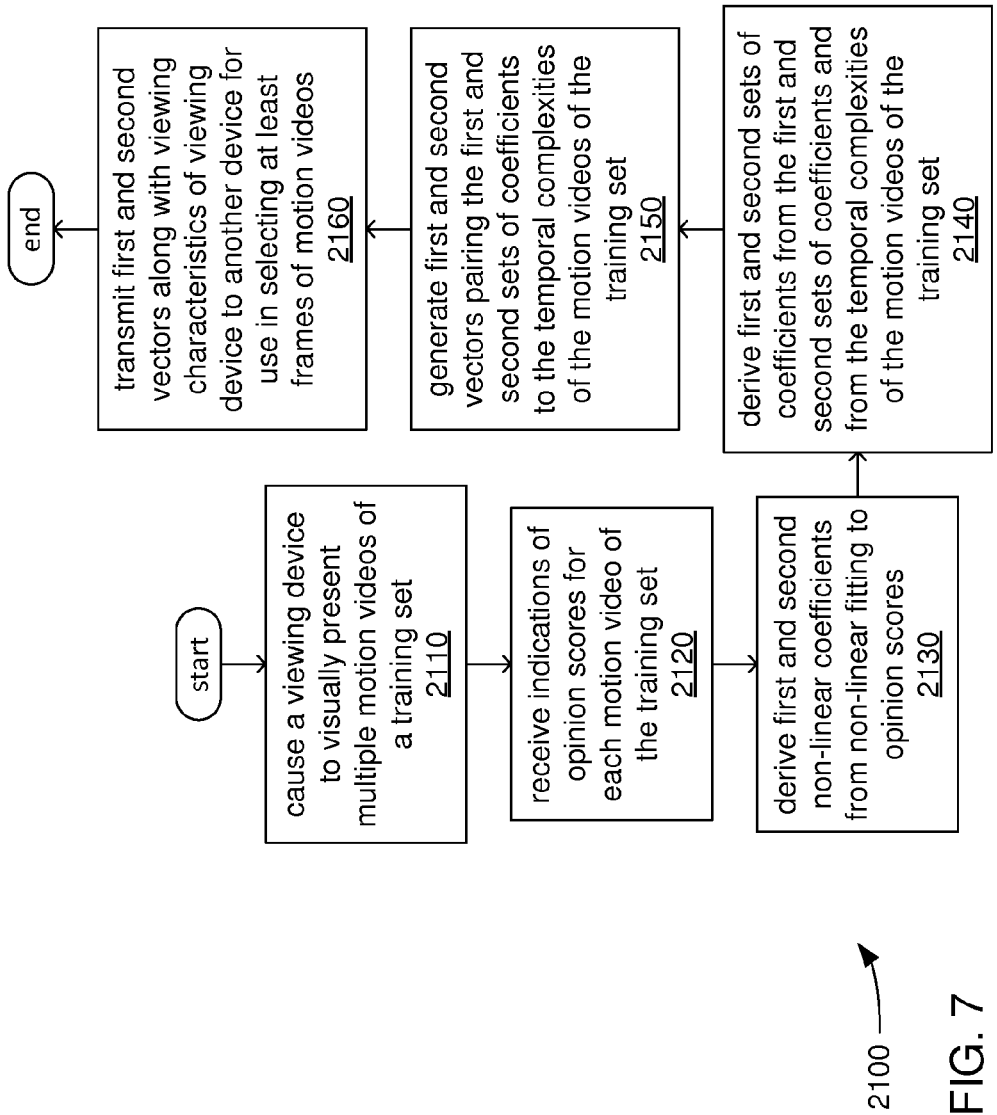
FIGS. 7-9 each illustrate a logic flow according to an embodiment.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor component 150 in executing at least the control routine 140, and/or performed by other component(s) of the training device 100.

At 2110, a processor component of a training device (e.g., the processor component 150 of the training device 100) causes a viewing device to visually present multiple motion videos of a training set of motion videos. The motion videos may be transmitted to the viewing device or otherwise provided to the viewing device via such mechanisms as removable storage media (e.g., optical disk, non-volatile solid state storage devices, etc.). As previously explained, each of the motion videos may be selected based on its temporal complexity to provide the training set with a selected range of temporal complexities of a selected distribution.

At 2120, indications of opinion scores of persons viewing each of the motion videos of the training via the viewing device set are received, and are stored as raw training data. As has been discussed, the scores may be based on the numerical scoring system of values of 1 through 5 commonly used in implementing the widely known and used MOS evaluation technique.

At 2130, first and second non-linear of coefficients of at least one mathematical model are derived from the opinion scores of the raw training data through non-linear fitting, which may be iterative. At 2140, for each of the motion videos of the training set, separate first and second sets of coefficients are then derived from the first and second non-linear of coefficients, and from the temporal complexity of each of the motion videos.

At 2150, all of the first sets of coefficients associated with each of the motion videos of the training set are paired with corresponding ones of the temporal complexities of those motion videos to form a first vector. Correspondingly, all of the second sets of coefficients associated with each of those motion videos are paired with corresponding ones of those temporal complexities to form a second vector indicative. As previously discussed, the two vectors together provide an indication of the video quality achieved in using the viewing device (or another viewing device of similar characteristics) to view motion videos of different temporal complexities.

At 2160, the first and second vectors are transmitted (or otherwise conveyed) to another device for use in compressing motion videos. As previously discussed, along with the first and second vectors, indications of one or more characteristics of the viewing device may also be transmitted or conveyed to that other device to enable the selection of the first and second vectors, or of another pair of vectors for use in selecting at least frames of more than one compressed version of a motion video to be transmitted.

Figure 8:
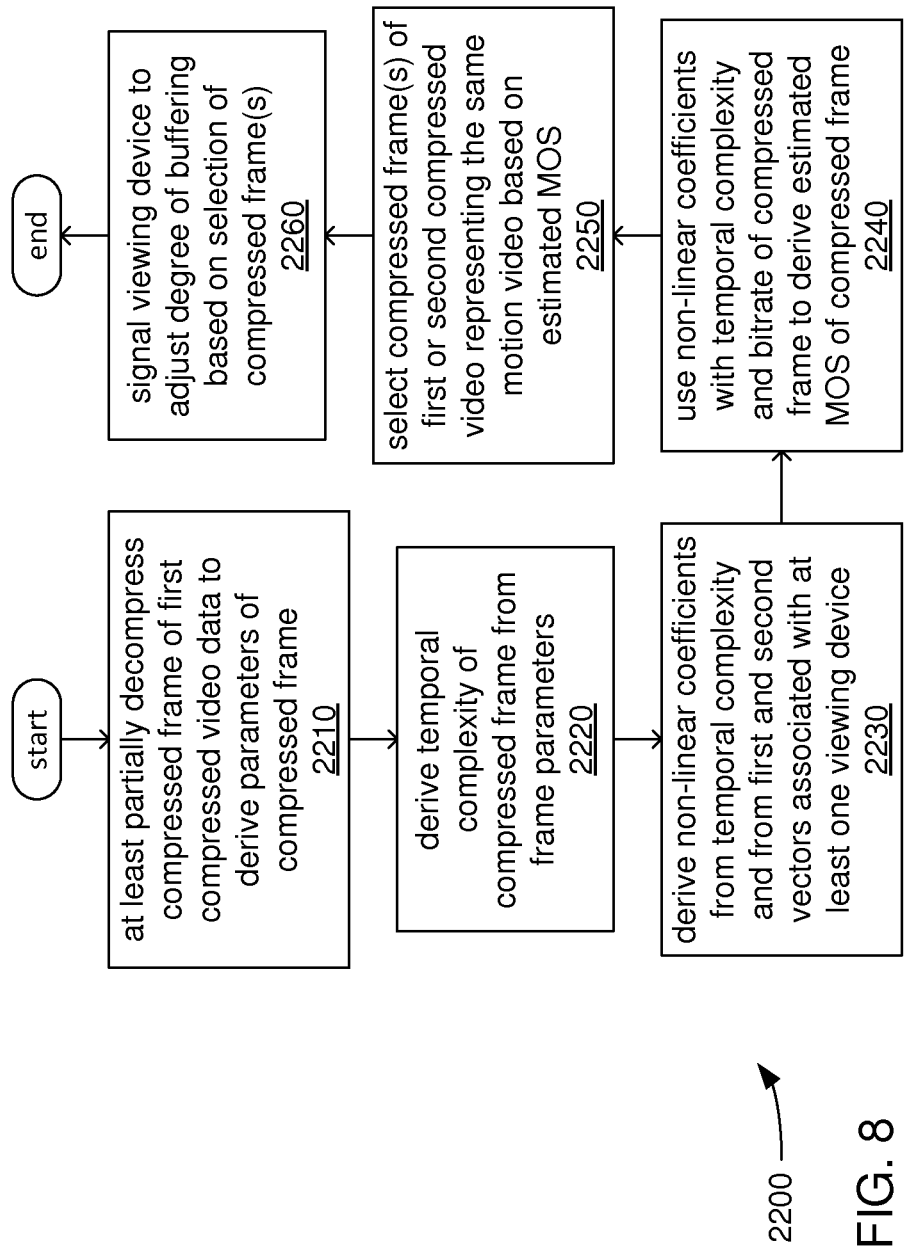

FIG. 8 illustrates one embodiment of a logic flow 2200. The logic flow 2200 may be representative of some or all of the operations executed by one or more embodiments described herein. More specifically, the logic flow 2200 may illustrate operations performed by the processor component 550 or 650 in executing at least the compressor 570 and/or the evaluation routine 640, and/or performed by other component(s) of the computing device 500 or the controller 600, respectively.

At 2210, a processor component of a computing device (e.g., either the processor component 550 of the computing device 500, or the processor component 650 of the controller 600) at least partially decompresses a compressed frame of a first compressed video data representing a motion video to derive various parameters of the compressed frame. As has been discussed, the type of motion video compression used to compress the motion video to generate the first compressed video data may be a lossy form of motion compression such as a version of MPEG. The parameters may include one or more of the data size of the compressed frame, the type of the compressed frame, the resolution of the compressed frame, a QP employed in the compression that generated the compressed frame, and/or a bitrate of that frame. At 2220, these parameters are employed to derive the temporal complexity of the compressed frame.

At 2230, first and second vectors associated a viewing device (or with multiple viewing devices having similar viewing characteristics) are employed, along with the temporal complexity of the compressed frame, to re-derive a version of non-linear coefficients associated with the temporal complexity of the compressed frame. As previously explained, the temporal complexity of the compressed frame is used to select the ones of the first and second sets of coefficients from the first and second vectors, respectively, that are associated with a temporal complexity that is closest to the temporal complexity of the compressed frame. The first and second sets of coefficients are then used, along with temporal complexity of the compressed frame, to re-derive the non-linear components.

At 2240, the re-derived non-linear coefficients are used along with the temporal complexity and bitrate of the compressed frame to derive an estimated MOS of the compressed frame. As previously explained, the estimated MOS may be intended to have a value in the range of 1 through 5 in keeping with the widely known and used MOS evaluation techniques, and may be adjusted to fall within that range if it does not do so as derived.

At 2250, one or more compressed frames of at least one of the first compressed video data and a second compressed video data also representing the motion video are selected based on the estimated MOS. As previously discussed, the selection of compressed frames from more than one compressed video data representing the motion video may entail mixing compressed frames from each or may entail selecting the entirety of one of the more than one compressed video data.

At 2260, the viewing device may be signaled to adjust the degree of buffering it employs in receiving the motion video in compressed form and visually presenting the motion video in response to the selection of the one or more compressed frames. As previously discussed, where the one or more compressed frames are of the motion video in a form that is compressed to a lesser degree, the viewing device may be signaled to increase the degree of buffering to accommodate the higher bitrate requirement of the one or more compressed frames.

Figure 9:
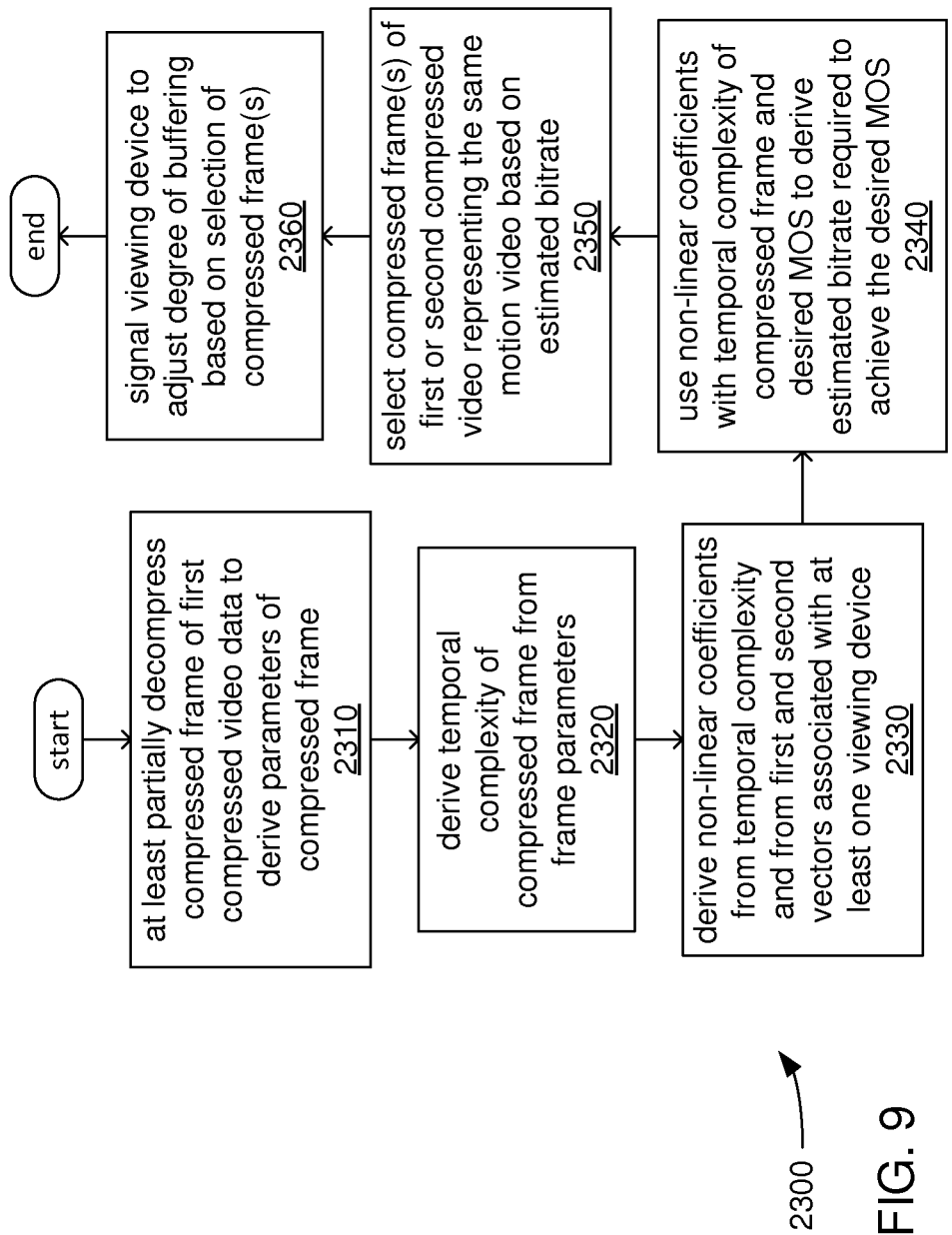

FIG. 9 illustrates one embodiment of a logic flow 2300. The logic flow 2300 may be representative of some or all of the operations executed by one or more embodiments described herein. More specifically, the logic flow 2300 may illustrate operations performed by the processor component 550 or 650 in executing at least the compressor 570 and/or the evaluation routine 640, and/or performed by other component(s) of the computing device 500 or the controller 600, respectively.

At 2310 through 2330, the processor component of a computing device (e.g., either the processor component 550 of the computing device 500, or the processor component 650 of the controller 600) performs operations that are substantially similar to what was described as performed by a processor component at 2210 through 2230 of FIG. 8. Again, a compressed frame of a first compressed video data representing a motion video is at least partially decompressed to derive various parameters thereof, and then those parameters are employed to derive a temporal complexity of the compressed frame. The temporal complexity of the compressed frame, in turn, is employed to re-derive a version of non-linear coefficients from first and second sets of components retrieved from first and second vectors associated with a viewing device of selected viewing characteristics.

At 2340, the re-derived non-linear coefficients are used along with the temporal complexity of the compressed frame and an indication of a desired MOS to derive an estimated bitrate of the compressed frame. As previously explained, the estimated bitrate may then be subjected to an upper limit associated with a maximum bitrate that may be able to be supported for transmissions.

At 2350, one or more compressed frames of at least one of the first compressed video data and a second compressed video data also representing the motion video are selected based on the estimated bitrate. As previously discussed, the selection of compressed frames from more than one compressed video data representing the motion video may entail mixing compressed frames from each or may entail selecting the entirety of one of the more than one compressed video data.

At 2360, the viewing device may be signaled to adjust the degree of buffering it employs in receiving the motion video in compressed form and visually presenting the motion video in response to the selection of the one or more compressed frames. As previously discussed, where the one or more compressed frames are of the motion video in a form that is compressed to a lesser degree, the viewing device may be signaled to increase the degree of buffering to accommodate the higher bitrate requirement of the one or more compressed frames.

Figure 10:
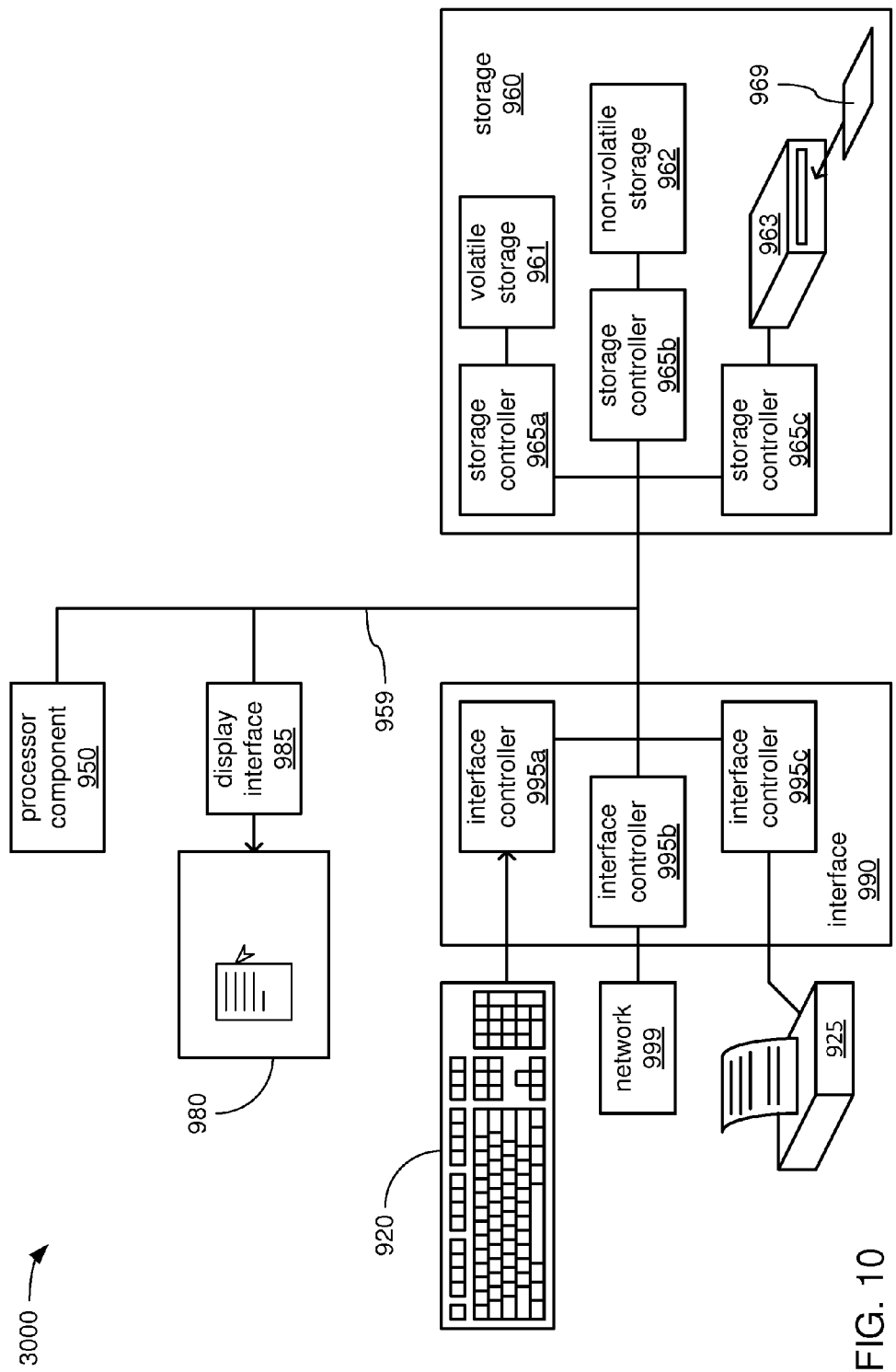
FIG. 10 illustrates a processing architecture according to an embodiment.

FIG. 10 illustrates an embodiment of an exemplary processing architecture 3000 suitable for implementing various embodiments as previously described. More specifically, the processing architecture 3000 (or variants thereof) may be implemented as part of one or more of the computing devices 100, 300, 500 or 700, and/or as part of the controller 600. It should be noted that components of the processing architecture 3000 are given reference numbers in which the last two digits correspond to the last two digits of reference numbers of at least some of the components earlier depicted and described as part of the computing devices 100, 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 150, 550, 650 and 750) may include any of a wide variety of commercially available processors, employing any of a wide variety of technologies and implemented with one or more cores physically combined in any of a number of ways.

As previously discussed, the storage 960 (corresponding to the storages 160, 560, 660 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 190, 590 or 790) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Figure 11:
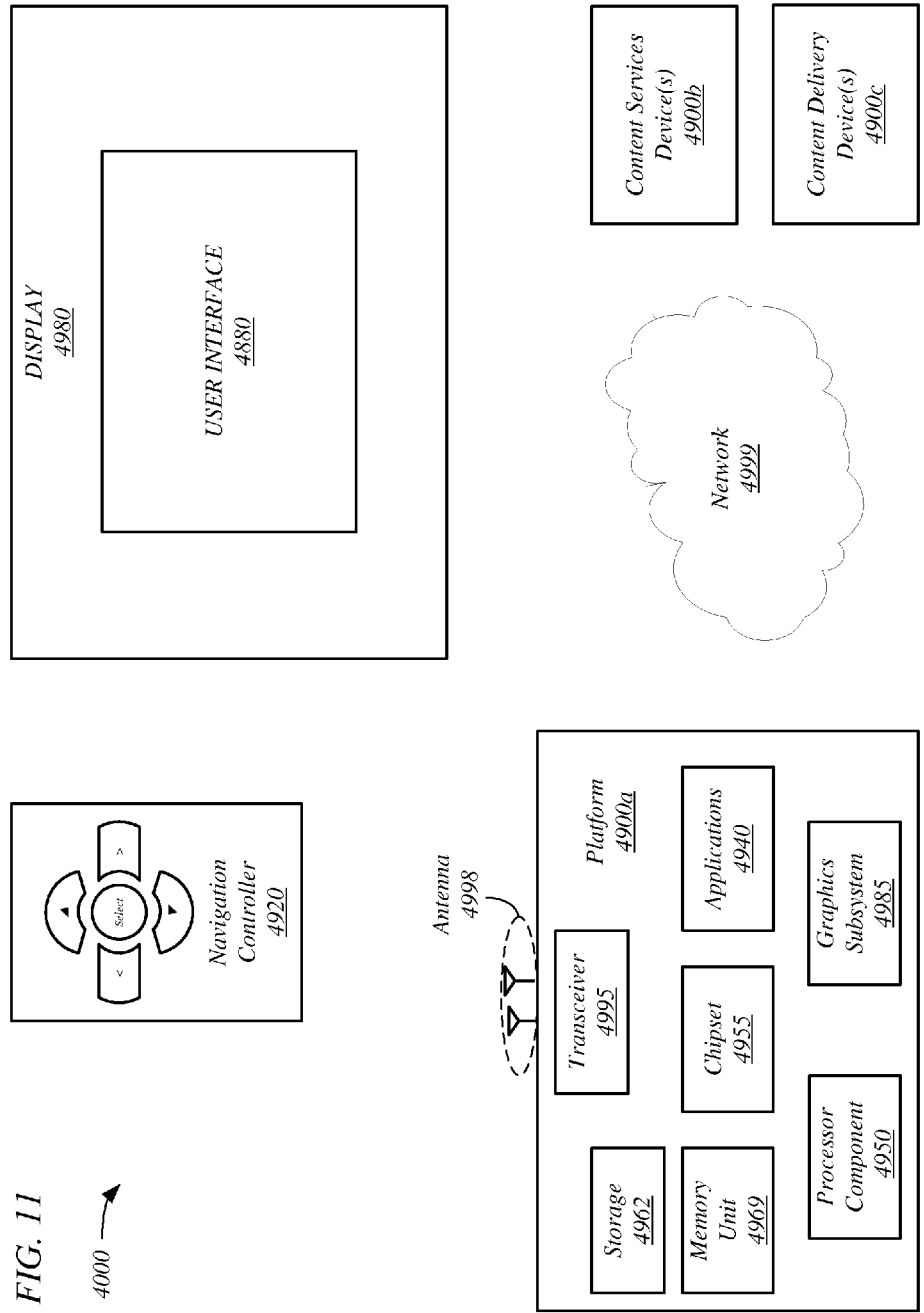
FIG. 11 illustrates another alternate embodiment of a graphics processing system.

FIG. 11 illustrates an embodiment of a system 4000. In various embodiments, system 4000 may be representative of a system or architecture suitable for use with one or more embodiments described herein, such as the graphics processing system 1000; one or more of the computing devices 100, 500 or 700; and/or one or more of the logic flows 2100 or 2200. The embodiments are not limited in this respect.

As shown, system 4000 may include multiple elements. One or more elements may be implemented using one or more circuits, components, registers, processors, software subroutines, modules, or any combination thereof, as desired for a given set of design or performance constraints. Although FIG. 11 shows a limited number of elements in a certain topology by way of example, it can be appreciated that more or less elements in any suitable topology may be used in system 4000 as desired for a given implementation. The embodiments are not limited in this context.

In embodiments, system 4000 may be a media system although system 4000 is not limited to this context. For example, system 4000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 4000 includes a platform 4900*a* coupled to a display 4980. Platform 4900*a* may receive content from a content device such as content services device(s) 4900*c* or content delivery device(s) 4900*d* or other similar content sources. A navigation controller 4920 including one or more navigation features may be used to interact with, for example, platform 4900*a* and/or display 4980. Each of these components is described in more detail below.

In embodiments, platform 4900*a* may include any combination of a processor component 4950, chipset 4955, memory unit 4969, transceiver 4995, storage 4962, applications 4940, and/or graphics subsystem 4985. Chipset 4955 may provide intercommunication among processor circuit 4950, memory unit 4969, transceiver 4995, storage 4962, applications 4940, and/or graphics subsystem 4985. For example, chipset 4955 may include a storage adapter (not depicted) capable of providing intercommunication with storage 4962.

Processor component 4950 may be implemented using any processor or logic device, and may be the same as or similar to one or more of processor components 150, 550, 650 or 750, and/or to processor component 950 of FIG. 10.

Memory unit 4969 may be implemented using any machine-readable or computer-readable media capable of storing data, and may be the same as or similar to storage media 969 of FIG. 10.

Transceiver 4995 may include one or more radios capable of transmitting and receiving signals using various suitable wireless communications techniques, and may be the same as or similar to transceiver 995*b* in FIG. 10.

Display 4980 may include any television type monitor or display, and may be the same as or similar to one or more of displays 380 and 680, and/or to display 980 in FIG. 10.

Storage 4962 may be implemented as a non-volatile storage device, and may be the same as or similar to non-volatile storage 962 in FIG. 10.

Graphics subsystem 4985 may perform processing of images such as still or video for display. Graphics subsystem 4985 may be a graphics processing unit (GPU) or a visual processing unit (VPU), for example. An analog or digital interface may be used to communicatively couple graphics subsystem 4985 and display 4980. For example, the interface may be any of a High-Definition Multimedia Interface, DisplayPort, wireless HDMI, and/or wireless HD compliant techniques. Graphics subsystem 4985 could be integrated into processor circuit 4950 or chipset 4955. Graphics subsystem 4985 could be a stand-alone card communicatively coupled to chipset 4955.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 4900*b* may be hosted by any national, international and/or independent service and thus accessible to platform 4900*a* via the Internet, for example. Content services device(s) 4900*b* may be coupled to platform 4900*a* and/or to display 4980. Platform 4900*a* and/or content services device(s) 4900*b* may be coupled to a network 4999 to communicate (e.g., send and/or receive) media information to and from network 4999. Content delivery device(s) 4900*c* also may be coupled to platform 4900*a* and/or to display 4980.

In embodiments, content services device(s) 4900*b* may include a cable television box, personal computer, network, telephone, Internet enabled devices or appliance capable of delivering digital information and/or content, and any other similar device capable of unidirectionally or bidirectionally communicating content between content providers and platform 4900*a* and/display 4980, via network 4999 or directly. It will be appreciated that the content may be communicated unidirectionally and/or bidirectionally to and from any one of the components in system 4000 and a content provider via network 4999. Examples of content may include any media information including, for example, video, music, medical and gaming information, and so forth.

Content services device(s) 4900b receives content such as cable television programming including media information, digital information, and/or other content. Examples of content providers may include any cable or satellite television or radio or Internet content providers. The provided examples are not meant to limit embodiments.

In embodiments, platform 4900a may receive control signals from navigation controller 4920 having one or more navigation features. The navigation features of navigation controller 4920 may be used to interact with a user interface 4880, for example. In embodiments, navigation controller 4920 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 4920 may be echoed on a display (e.g., display 4980) by movements of a pointer, cursor, focus ring, or other visual indicators displayed on the display. For example, under the control of software applications 4940, the navigation features located on navigation controller 4920 may be mapped to virtual navigation features displayed on user interface 4880. In embodiments, navigation controller 4920 may not be a separate component but integrated into platform 4900a and/or display 4980. Embodiments, however, are not limited to the elements or in the context shown or described herein.

In embodiments, drivers (not shown) may include technology to enable users to instantly turn on and off platform 4900a like a television with the touch of a button after initial boot-up, when enabled, for example. Program logic may allow platform 4900a to stream content to media adaptors or other content services device(s) 4900b or content delivery device(s) 4900c when the platform is turned "off" In addition, chip set 4955 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 4000 may be integrated. For example, platform 4900a and content services device(s) 4900b may be integrated, or platform 4900a and content delivery device(s) 4900c may be integrated, or platform 4900a, content services device(s) 4900b, and content delivery device(s) 4900c may be integrated, for example. In various embodiments, platform 4900a and display 4890 may be an integrated unit. Display 4980 and content service device(s) 4900b may be integrated, or display 4980 and content delivery device(s) 4900c may be integrated, for example. These examples are not meant to limit embodiments.

In various embodiments, system 4000 may be implemented as a wireless system, a wired system, or a combination of both. When implemented as a wireless system, system 4000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 4000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 4900a may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
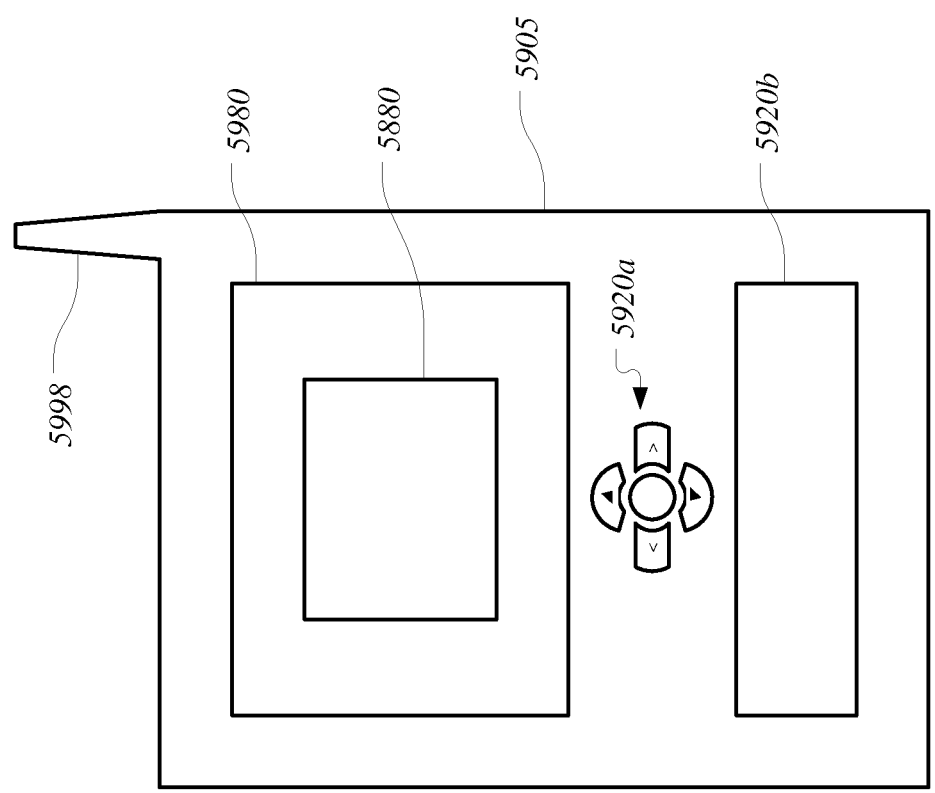
FIG. 12 illustrates an embodiment of a device.

As described above, system 4000 may be embodied in varying physical styles or form factors. FIG. 12 illustrates embodiments of a small form factor device 5000 in which system 4000 may be embodied. In embodiments, for example, device 5000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 5000 may include a display 5980, a navigation controller 5920a, a user interface 5880, a housing 5905, an I/O device 5920b, and an antenna 5998. Display 5980 may include any suitable display unit for displaying information appropriate for a mobile computing device, and may be the same as or similar to display 4980 in FIG. 11. Navigation controller 5920a may include one or more navigation features which may be used to interact with user interface 5880, and may be the same as or similar to navigation controller 4920 in FIG. 11. I/O device 5920b may include any suitable I/O device for entering information into a mobile computing device. Examples for I/O device 5920b may include an alphanumeric keyboard, a numeric keypad, a touch pad, input keys, buttons, switches, rocker switches, microphones, speakers, voice recognition device and software, and so forth. Information also may be entered into device 5000 by way of a microphone. Such information may be digitized by a voice recognition device. The embodiments are not limited in this context.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, a device to transmit motion video includes a device scoring component to select a set of coefficients from at least one vector that correlates temporal complexity values to sets of coefficients based on a temporal complexity of a first compressed frame of a first compressed video data, the at least one vector derived from opinion scores associated with at least one viewing characteristic of a viewing device; and a selection component to select one of the first compressed frame and a second compressed frame of a second compressed data to transmit to the viewing device based on a metric of video quality derived from the selected set of coefficients, the first and second compressed data representing a motion video.

In Example 2, which includes the subject matter of Example 1, the device may include a decoder to decompress the first compressed frame to derive at least one parameter of the first compressed frame, the at least one parameter comprising at least one of a quantization parameter (QP) employed by a compressor to generate the first compressed frame, a resolution of the first compressed frame, a type of the first compressed frame, a data size of the first compressed frame or a bitrate of the first compressed frame.

In Example 3, which includes the subject matter of any of Examples 1-2, the device may include a complexity component to derive the temporal complexity of the first compressed frame from the at least one parameter.

In Example 4, which includes the subject matter of any of Examples 1-3, the device may include a mean opinion score (MOS) estimator to use at least the selected set of coefficients and a bitrate of the first compressed frame to derive an estimated MOS of the first compressed frame, the metric of video quality comprising the estimated MOS.

In Example 5, which includes the subject matter of any of Examples 1-4, the device may include a bitrate estimator to use at least the selected set of coefficients and a desired MOS value to derive an estimated bitrate required to achieve the desired MOS value, the metric of video quality comprising the estimated bitrate.

In Example 6, which includes the subject matter of any of Examples 1-5, the device may include an interface to receive the at least one vector from another device.

In Example 7, which includes the subject matter of any of Examples 1-6, the device may include a training component to derive the at least one vector from the opinion scores, the opinion scores associated with viewing multiple motion videos of a training set of motion videos using another viewing device having the at least one viewing characteristic.

In Example 8, which includes the subject matter of any of Examples 1-7, the device may include a buffering component to transmit an indication to the viewing device to alter a degree of buffering provided by the viewing device to enable viewing of the motion video on a display of the viewing device based on the selection of one of the first and second compressed frames.

In Example 9, which includes the subject matter of any of Examples 1-8, the at least one viewing characteristic comprising at least one of a display size, a display resolution or a viewing distance.

In Example 10, which includes the subject matter of any of Examples 1-9, the device may include an interface to transmit the motion video in a compressed form comprising the selected one of the first and second compressed frames to the viewing device.

In Example 11, a device to transmit motion video includes a non-linear fitting component to derive from raw data at least one mathematical model correlating a range of temporal complexities to a range of opinion scores associated with a viewing device having at least one viewing characteristic, the raw data comprising opinion scores collected from using the viewing device to view multiple motion videos of different temporal complexities of a training set of motion videos; and a linear fitting component to derive at least one vector correlating temporal complexity values to sets of coefficients associated with the at least one viewing characteristic.

In Example 12, which includes the subject matter of Example 11, the device may include a collection component to monitor controls for an indication of operation of the controls to provide at least one of the opinion scores.

In Example 13, which includes the subject matter of any of Examples 11-12, the collection component to provide the multiple motion videos to the viewing device.

In Example 14, which includes the subject matter of any of Examples 11-13, the multiple motion videos of the training set selected to provide the training set with a selected range of temporal complexities with a selected distribution of temporal complexities.

In Example 15, which includes the subject matter of any of Examples 11-14, the at least one viewing characteristic comprising at least one of a display size, a display resolution or a viewing distance.

In Example 16, which includes the subject matter of any of Examples 11-15, the device may include an interface to transmit the at least one vector to another device to enable the other device to use the at least one vector with a temporal complexity of another motion video to control selection of compressed frames representing the other motion video to another viewing device having the at least one viewing characteristic.

In Example 17, a computing-implemented method for compressing motion video includes selecting a set of coefficients from at least one vector that correlates temporal complexity values to sets of coefficients based on a temporal complexity of a first compressed frame of a first compressed video data, the at least one vector derived from opinion scores associated with at least one viewing characteristic of a viewing device; and selecting one of the first compressed frame and a second compressed frame of a second compressed data to transmit to the viewing device based on a metric of video quality derived from the selected set of coefficients, the first and second compressed data representing a motion video.

In Example 18, which includes the subject matter of Example 17, the method may include decompressing the first compressed frame to derive at least one parameter of the first compressed frame, the at least one parameter comprising at least one of a quantization parameter (QP) employed in generating the first compressed frame, a resolution of the first compressed frame, a type of the first compressed frame, a data size of the first compressed frame or a bitrate of the first compressed frame.

In Example 19, which includes the subject matter of any of Examples 17-18, the method may include deriving a temporal complexity of the first compressed frame from the at least one parameter.

In Example 20, which includes the subject matter of any of Examples 17-19, the method may include using at least the selected set of coefficients and a bitrate of the first compressed frame to derive an estimated MOS of the first compressed frame, the metric of video quality comprising the estimated MOS.

In Example 21, which includes the subject matter of any of Examples 17-20, the method may include using at least the selected set of coefficients and a desired MOS value to derive an estimated bitrate required to achieve the desired MOS value, the metric of video quality comprising the estimated bitrate.

In Example 22, which includes the subject matter of any of Examples 17-21, the method may include receiving the at least one vector from another device.

In Example 23, which includes the subject matter of any of Examples 17-22, the method may include deriving the at least one vector from the opinion scores, the opinion scores associated with viewing multiple motion videos of a training set of motion videos using another viewing device having the at least one viewing characteristic.

In Example 24, which includes the subject matter of any of Examples 17-23, the method may include transmitting an indication to the viewing device to alter a degree of buffering provided by the viewing device to enable viewing of the motion video on a display of the viewing device based on the selection of one of the first and second compressed frames.

In Example 25, which includes the subject matter of any of Examples 17-24, the at least one viewing characteristic comprising at least one of a display size, a display resolution or a viewing distance.

In Example 26, which includes the subject matter of any of Examples 17-25, the method may include transmitting the motion video in a compressed form comprising the selected one of the first and second compressed frames to the viewing device.

In Example 27, at least one machine-readable storage medium includes instructions that when executed by a computing device, cause the computing device to select a set of coefficients from at least one vector that correlates temporal complexity values to sets of coefficients based on a temporal complexity of a first compressed frame of a first compressed video data, the at least one vector derived from opinion scores associated with at least one viewing characteristic of a viewing device; and select one of the first compressed frame and a second compressed frame of a second compressed data to transmit to the viewing device based on a metric of video quality derived from the selected set of coefficient, the first and second compressed data representing a motion video.

In Example 28, which includes the subject matter of Example 27, the computing device may be caused to decompress the first compressed frame to derive at least one parameter of the first compressed frame, the at least one parameter comprising at least one of a quantization parameter (QP) employed in generating the first compressed frame, a resolution of the first compressed frame, a type of the first compressed frame, a data size of the first compressed frame or a bitrate of the first compressed frame.

In Example 29, which includes the subject matter of any of Examples 27-28, the computing device may be caused to derive a temporal complexity of the first compressed frame from the at least one parameter.

In Example 30, which includes the subject matter of any of Examples 27-29, the computing device may be caused to use at least the selected set of coefficients and a bitrate of the first compressed frame to derive an estimated MOS of the first compressed frame, the metric of video quality comprising the estimated MOS.

In Example 31, which includes the subject matter of any of Examples 27-30, the computing device may be caused to use at least the selected set of coefficients and a desired MOS value to derive an estimated bitrate required to achieve the desired MOS value, the metric of video quality comprising the estimated bitrate.

In Example 32, which includes the subject matter of any of Examples 27-31, the computing device may be caused to receive the at least one vector from another device.

In Example 33, which includes the subject matter of any of Examples 27-32, the computing device may be caused to derive the at least one vector from the opinion scores, the opinion scores associated with viewing multiple motion videos of a training set of motion videos using another viewing device having the at least one viewing characteristic.

In Example 34, which includes the subject matter of any of Examples 27-33, the computing device may be caused to transmit an indication to the viewing device to alter a degree of buffering provided by the viewing device to enable viewing of the motion video on a display of the viewing device based on the selection of one of the first and second compressed frames.

In Example 35, which includes the subject matter of any of Examples 27-34, the at least one viewing characteristic comprising at least one of a display size, a display resolution or a viewing distance.

In Example 36, which includes the subject matter of any of Examples 27-35, the computing device may be caused to transmit the motion video in a compressed form comprising the selected one of the first and second compressed frames to the viewing device.

In Example 37, at least one machine-readable storage medium may include instructions that when executed by a computing device, cause the computing device to perform any of the above.

In Example 38, a device to transmit motion may include means for performing any of the above.

The invention claimed is:

1. A device to transmit motion video comprising:
   a device scoring component to select a set of coefficients from a plurality of vectors that each correlate temporal complexity values to one or more sets of coefficients based on a temporal complexity of a first compressed frame of a first compressed video data, the plurality of vectors each derived from opinion scores associated with a different set of viewing characteristics of at least one viewing device;
   a selection component to select one of the first compressed frame and a second compressed frame of a second compressed video data to transmit to a viewing device with at least one viewing characteristic associated with the selected set of coefficients based on a metric of video quality derived from the selected set of coefficients, the first and second compressed video data representing a motion video; and
   a buffering component to transmit an indication to the viewing device to alter a degree of buffering provided by the viewing device to enable viewing of the motion video on a display of the viewing device based on the selection of one of the first and second compressed frames.

2. The device of claim 1, comprising a decoder to decompress the first compressed frame to derive at least one parameter of the first compressed frame, the at least one parameter comprising at least one of a quantization parameter (QP) employed by a compressor to generate the first compressed frame, a resolution of the first compressed frame, a type of the first compressed frame, a data size of the first compressed frame or a bitrate of the first compressed frame.

3. The device of claim 2, comprising a complexity component to derive the temporal complexity of the first compressed frame from the at least one parameter.

4. The device of claim 3, comprising a mean opinion score (MOS) estimator to use at least the selected set of coefficients and a bitrate of the first compressed frame to derive an estimated MOS of the first compressed frame, the metric of video quality comprising the estimated MOS.

5. The device of claim 3, comprising a bitrate estimator to use at least the selected set of coefficients and a desired MOS value to derive an estimated bitrate required to achieve the desired MOS value, the metric of video quality comprising the estimated bitrate.

6. The device of claim 1, comprising an interface to transmit the motion video in a compressed form comprising the selected one of the first and second compressed frames to the viewing device.

7. A device to transmit motion video comprising:
   a non-linear fitting component to derive from raw data a plurality of mathematical models that each correlate a range of temporal complexities to a range of opinion scores associated with a different set of viewing characteristics of at least one viewing device, the raw data comprising opinion scores collected from using at least one viewing device associated with each set of viewing characteristics to view multiple motion videos of different temporal complexities of a training set of motion videos;
   a linear fitting component to derive at least one vector for each of the plurality of mathematical models that correlates temporal complexity values to sets of coefficients associated with each of the different sets of viewing characteristics; and
   a buffering component to transmit an indication to the viewing device to alter a degree of buffering provided by the viewing device to enable viewing of the motion video on a display of the viewing device based on at least the at least one vector.

8. The device of claim 7, comprising a collection component to monitor controls for an indication of operation of the controls to provide at least one of the opinion scores.

9. The device of claim 8, the collection component to provide the multiple motion videos to a viewing device associated with a selected set of viewing characteristics.

10. The device of claim 7, the multiple motion videos of the training set selected to provide the training set with a selected range of temporal complexities with a selected distribution of temporal complexities.

11. The device of claim 7, comprising an interface to transmit the at least one vector to another device to enable the other device to use the at least one vector with a temporal complexity of another motion video to control selection of compressed frames representing the other motion video to another viewing device having the at least one viewing characteristic.

12. A computer-implemented method for transmitting motion video comprising:
selecting a set of coefficients from a plurality of vectors that each correlate temporal complexity values to one or more sets of coefficients based on a temporal complexity of a first compressed frame of a first compressed video data, the plurality of vectors each derived from opinion scores associated with a different set of viewing characteristics of at least one viewing device;
selecting one of the first compressed frame and a second compressed frame of a second compressed video data to transmit to a viewing device with at least one viewing characteristic associated with the selected set of coefficients based on a metric of video quality derived from the selected set of coefficients, the first and second compressed video data representing a motion video; and
transmitting an indication to the viewing device to alter a degree of buffering provided by the viewing device to enable viewing of the motion video on a display of the viewing device based on the selection of one of the first and second compressed frames.

13. The computer-implemented method of claim 12, the method comprising decompressing the first compressed frame to derive at least one parameter of the first compressed frame, the at least one parameter comprising at least one of a quantization parameter (QP) employed in generating the first compressed frame, a resolution of the first compressed frame, a type of the first compressed frame, a data size of the first compressed frame or a bitrate of the first compressed frame.

14. The computer-implemented method of claim 13, the method comprising deriving a temporal complexity of the first compressed frame from the at least one parameter.

15. The computer-implemented method of claim 14, the method comprising using at least the selected set of coefficients and a bitrate of the first compressed frame to derive an estimated MOS of the first compressed frame, the metric of video quality comprising the estimated MOS.

16. The computer-implemented method of claim 12, the opinion scores associated with viewing multiple motion videos of a training set of motion videos using viewing devices having selected sets of viewing characteristics.

17. The computer-implemented method of claim 12, the at least one viewing characteristic comprising at least one of a display size, a display resolution or a viewing distance.

18. The computer-implemented method of claim 12, the method comprising transmitting the motion video in a compressed form comprising the selected one of the first and second compressed frames to the viewing device.

19. At least one non-transitory machine-readable storage medium comprising instructions that when executed by a computing device, cause the computing device to:
select a set of coefficients from a plurality of vectors that each correlate temporal complexity values to one or more sets of coefficients based on a temporal complexity of a first compressed frame of a first compressed video data, the plurality of vectors each derived from opinion scores associated with a different set of viewing characteristics of at least one viewing device;
select one of the first compressed frame and a second compressed frame of a second compressed video data to transmit to a viewing device with at least one viewing characteristic associated with the selected set of coefficients based on a metric of video quality derived from the selected set of coefficient, the first and second compressed video data representing a motion video; and
transmitting an indication to the viewing device to alter a degree of buffering provided by the viewing device to enable viewing of the motion video on a display of the viewing device based on the selection of one of the first and second compressed frames.

20. The at least one non-transitory machine-readable storage medium of claim 19, the computing device caused to decompress the first compressed frame to derive at least one parameter of the first compressed frame, the at least one parameter comprising at least one of a quantization parameter (QP) employed in generating the first compressed frame, a resolution of the first compressed frame, a type of the first compressed frame, a data size of the first compressed frame or a bitrate of the first compressed frame.

21. The at least one non-transitory machine-readable storage medium of claim 20, the computing device caused to derive a temporal complexity of the first compressed frame from the at least one parameter.

22. The at least one non-transitory machine-readable storage medium of claim 21, the computing device caused to use at least the selected set of coefficients and a desired MOS value to derive an estimated bitrate required to achieve the desired MOS value, the metric of video quality comprising the estimated bitrate.

23. The at least one non-transitory machine-readable storage medium of claim 19, the computing device caused to transmit an indication to the viewing device to alter a degree of buffering provided by the viewing device to enable viewing of the motion video on a display of the viewing device based on the selection of one of the first and second compressed frames.

24. The at least one non-transitory machine-readable storage medium of claim 19, the computing device caused to transmit the motion video in a compressed form comprising the selected one of the first and second compressed frames to the viewing device.

* * * * *